US012527983B2

(12) United States Patent
Friend et al.

(10) Patent No.: US 12,527,983 B2
(45) Date of Patent: Jan. 20, 2026

(54) REMOVABLE SPRINKLER PROTECTION DEVICE

(71) Applicant: Tyco Fire Products LP, Lansdale, PA (US)

(72) Inventors: Richard David Friend, Levittown, PA (US); Bharani Kannan, Chennai (IN); Anthony Baker, Hubertus, WI (US)

(73) Assignee: Tyco Fire Products LP, Cranston, RI (US)

( * ) Notice: Subject to any disclaimer, the term of this patent is extended or adjusted under 35 U.S.C. 154(b) by 523 days.

(21) Appl. No.: 18/073,323

(22) Filed: Dec. 1, 2022

(65) Prior Publication Data

US 2023/0173316 A1 Jun. 8, 2023

Related U.S. Application Data

(60) Provisional application No. 63/285,178, filed on Dec. 2, 2021.

(51) Int. Cl.
*B05B 15/16* (2018.01)
*A62C 35/68* (2006.01)

(52) U.S. Cl.
CPC .............. *A62C 35/68* (2013.01); *B05B 15/16* (2018.02)

(58) Field of Classification Search
None
See application file for complete search history.

(56) References Cited

U.S. PATENT DOCUMENTS 6,182,868 B1 * 2/2001 Hurray .................... B65D 5/16 222/145.5
6,669,111 B2 12/2003 Vinson et al.
7,757,967 B1 7/2010 Yang
7,900,852 B2 3/2011 Feenstra
9,027,660 B2 5/2015 Oldham
10,376,724 B2 8/2019 Macomber
10,940,348 B2 3/2021 Oldham et al.
2003/0085241 A1 * 5/2003 Brown ...................... B05B 7/24 222/527
2020/0180844 A1 * 6/2020 Olafsson .............. B65D 5/5445

* cited by examiner

*Primary Examiner* — Tuongminh N Pham
(74) *Attorney, Agent, or Firm* — Foley & Lardner LLP

(57) ABSTRACT

At least one aspect is directed to a removable sprinkler protection device. The removable sprinkler protection device can include a foldable unitary member. The foldable unitary member can include a first portion having a first extension, a second extension, a third extension, or a fourth extension. The foldable unitary member can include a second portion having a fifth extension, a sixth extension, or a seventh extension. The fourth extension can be disposed at least partially between the first portion and the second portion. The seventh extension can include a tab. The first portion or the second portion can include an opening. The foldable unitary member can be made from at least partially of a biodegradable material.

14 Claims, 23 Drawing Sheets

REMOVABLE SPRINKLER PROTECTION DEVICE

CROSS-REFERENCE TO RELATED APPLICATIONS

The present application claims the benefit of priority to U.S. Provisional Application No. 63/285,178, filed Dec. 2, 2021, the disclosure of which is incorporated herein by reference in its entirety.

BACKGROUND

Buildings and other areas can include sprinklers to provide fire protection. In the event of a fire, the sprinklers can dispense a fluid to control, suppress or extinguish the fire that occurs beneath an exterior projection.

SUMMARY

At least one aspect relates to a removable sprinkler protection device. The removable sprinkler protection device can include a foldable unitary member. The foldable unitary member can include a first portion having a first extension, a second extension, a third extension, or a fourth extension. The foldable unitary member can include a second portion having a fifth extension, a sixth extension, or a seventh extension. The fourth extension can be disposed at least partially between the first portion and the second portion. The seventh extension can include a tab. The first portion or the second portion can include an opening. The foldable unitary member can be made from at least partially of a biodegradable material.

At least one aspect relates to a sprinkler assembly. The sprinkler assembly can include a sprinkler. The sprinkler can include a top end, a bottom end, or a sprinkler actuator that extends at least partially between the top end and the bottom end. The sprinkler assembly can include a folded unitary member at least partially surrounding the sprinkler. The folded unitary member can include a top side, a bottom side, a first sidewall, a second sidewall, a third sidewall, or a fourth sidewall. The folded unitary member can include a release tab portion. The folded unitary member can include an opening to receive a portion of the sprinkler. The folded unitary member can be made at least partially of a biodegradable material.

At least one aspect relates to a method of installing a sprinkler protection device. The method can include folding a first extension, a second extension, and a third extension of first portion of a biodegradable unitary member relative to a first side of the biodegradable unitary member to form a first portion of the sprinkler protection device. The method can include positioning the first portion of the sprinkler protection device at a first portion of a sprinkler. The method can include folding a second side of the biodegradable unitary member relative to the first portion at a fourth extension such that the second side of the partially folded biodegradable unitary member positions at a second portion of the sprinkler. The method can include inserting a fifth extension and a sixth extension of a second portion of the sprinkler protection device into a portion of the first portion of the sprinkler protection device to form a second portion that couples with the first portion of the sprinkler protection device to enclose the sprinkler. The method can include pushing a flap positioned on the first portion of the biodegradable unitary member towards the sprinkler. The method can include pushing a flap positioned on the second portion of the biodegradable unitary member towards the sprinkler. The method can include pulling a release tab to unfold the first portion of the sprinkler protection device relative to the second portion of the sprinkler protection device. The method can include removing the biodegradable unitary member from the sprinkler. The method can include recycling the biodegradable unitary member.

At least one aspect relates to a sprinkler protection device. The sprinkler protection device can include a plurality of portions made of a pulp material, the plurality of portions extending along a longitudinal axis, at least one sprinkler receiver formed by at least one portion of the plurality of portions, at least one joint coupling a first portion of the plurality of portions with a second portion of the plurality of portions, a first fastener extending from a first end of the plurality of portions, and at least one of a second fastener and an opening proximate a second end of the plurality of portions opposite the first end, the first fastener to couple with the at least one of the second fastener and the opening.

DETAILED DESCRIPTION

Following below are more detailed descriptions of various concepts related to, and implementations of, methods, apparatuses, and systems of a sprinkler protection device. The various concepts introduced above and discussed in greater detail below may be implemented in any of numerous ways.

The present disclosure generally refers to a sprinkler protection device. The present disclosure refers to a sprinkler protection device configured to prevent damage to a fire protection sprinkler with transportation of or installment of the sprinkler. Sprinklers can have various components, such as thermal triggers that include glass bulbs or soldered link and lever assemblies, that can be susceptible to damage during transportation/shipment or installation. Sprinkler protection devices made of plastic can be positioned around these components to reduce the likelihood of damage; however, such devices may be difficult to dispose of through waste management and/or recycling processes after use.

Sprinkler protection devices in accordance with the present disclosure can be made of biodegradable paper pulp materials (e.g., biodegradable pulp; paper; pulp; fiber pulp; or various combinations thereof) to facilitate disposal of the sprinkler protection devices after use. For example, the sprinkler protection devices can be made of unitary bodies having relatively thin portions, such as perforations, to allow for the devices to be easily formed around the sprinkler for packaging. The devices can have particular concave surfaces to receive and support the sprinkler while minimizing the overall size of the sprinkler and device assembly and facilitating standardized and minimal form factor packaging of multiple sprinkler and devices assemblies in the same container. The devices can be made from particular portions or panels that can be folded relative to each other, and secured by fasteners to support the sprinkler.

Referring generally to the figures, a unitary body includes a plurality of extensions divided up by a plurality of perforations to fold into a removable sprinkler protection device. The removable sprinkler protection device can be installed over or onto a sprinkler to facilitate protection various portions of the sprinkler from damage during installation of the sprinkler (e.g., installation of the sprinkler into a ceiling, wall, or the like). The unitary body is made from a biodegradable material such that the unitary body may be recycled upon removal from the sprinkler.

Figure 1:
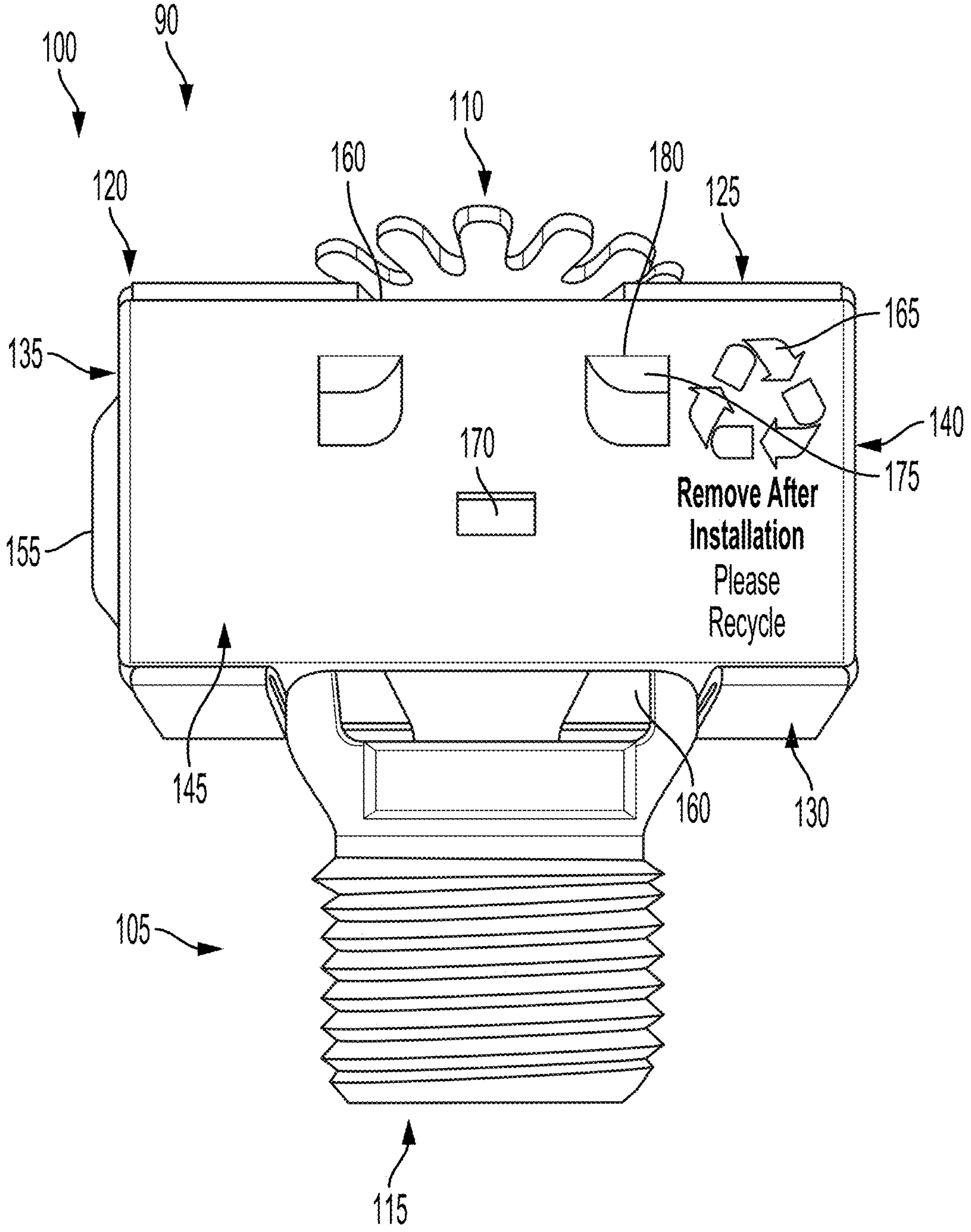
FIG. 1 is a front view of a sprinkler assembly, in accordance with an implementation.

FIG. 1 depicts an example sprinkler assembly 90. For example, the sprinkler assembly 90 can include a removable sprinkler protection device 100 at least partially surrounding a sprinkler 105. The sprinkler 105 may be or may include various types or sizes of sprinkler (e.g., fire protection sprinklers) including, but not limited to, sidewall sprinklers, ceiling sprinklers, dry barrel sprinklers, or the like. The sprinkler 105 can include a top end 110 and a bottom end 115. In some examples, the top end 110 can include one or more fluid dispersing components, such as a deflector. The bottom end 115 can include one or more fluid receiving or installation components, such as a body portion, piping portion, threading portion, or the like.

The sprinkler 105 can include at least one actuator 170 (partially visible in FIG. 1) that extends at least partially between the top end 110 and the bottom end 115. For example, the actuator 170 may include any component, assembly, or trigger to facilitate activating the sprinkler 105 such as a thermal glass bulb, fusible link, or a similar electric or mechanical actuator. In some examples, the sprinkler 105 may not include an actuator 170.

The sprinkler assembly 90 can include at least one folded unitary member 120. For example, the folded unitary member 120 can form the removable sprinkler protection device 100. The folded unitary member 120 can at least partially surround the sprinkler 105, as depicted in FIG. 1. The folded unitary member 120 can be made of biodegradable material, such as a pulp material. For example, the folded unitary member 120 can be made of at least one of paper, pulp, wood pulp, pulp fiber, cellulose fiber, paper pulp, or cardboard. The folded unitary member 120 can be made of a pulp from recycled paper-based materials such as paper, wood, or cardboard.

Figure 2:
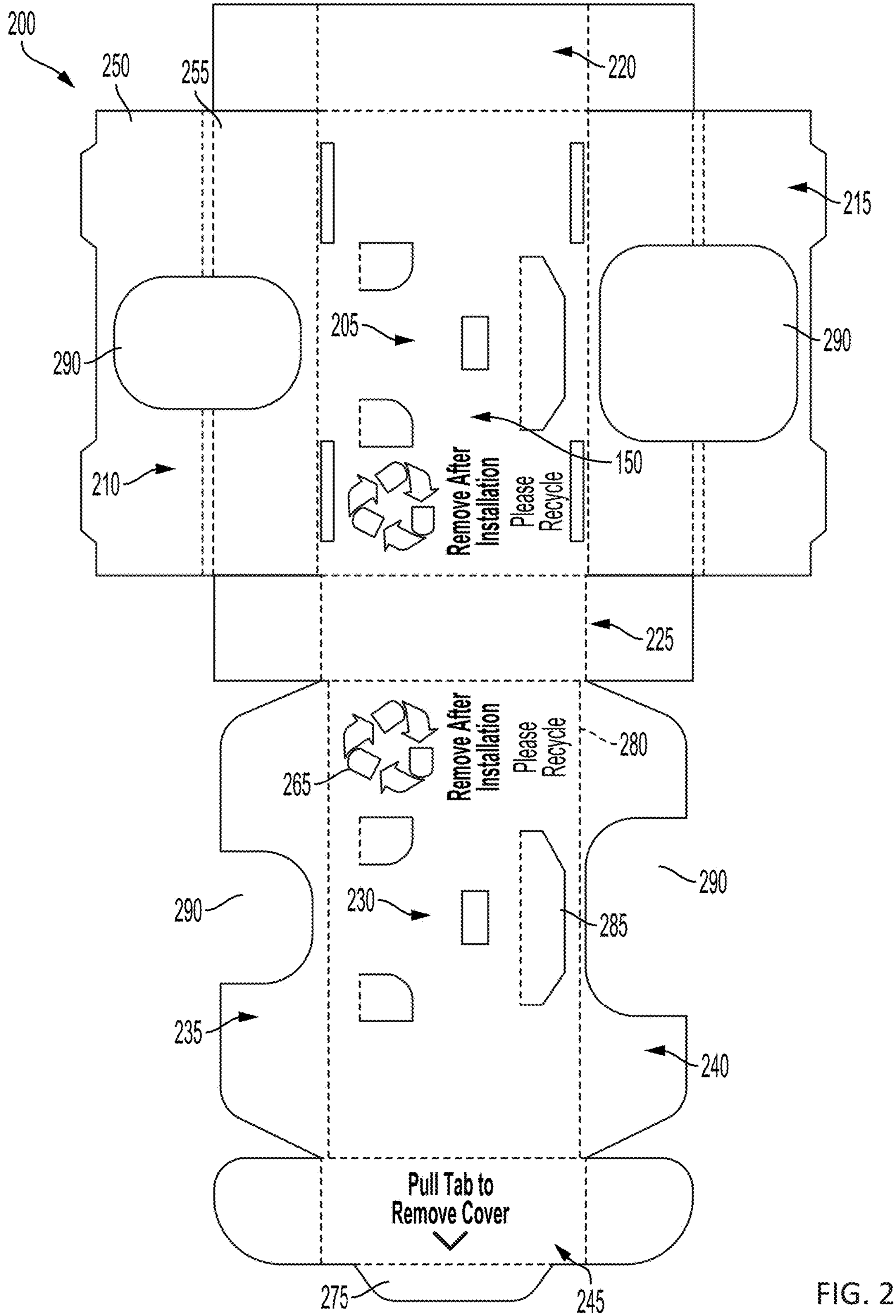
FIG. 2 is an exterior view of a sprinkler protection device of the sprinkler assembly of FIG. 1 in an unfolded state, in accordance with an implementation.

The folded unitary member 120 can include a top side 125, a bottom side 130, a first sidewall 135, a second sidewall 140, a third sidewall 145, and a fourth sidewall 150 (not visible in FIG. 1, but shown in FIG. 2). In some examples, the top side 125 may oppose the bottom side 130. In some examples, the first sidewall 135 may oppose the second sidewall 140. In some examples, the third sidewall 145 may oppose the fourth sidewall 150. For example, the folded unitary member 120 may be or may include a rectangular shape. In some examples, the folded unitary member 120 may be or may include various shapes including, but not limited to, triangular or cylindrical.

The folded unitary member 120 may include at least one release tab portion 155. For example, the release tab portion 155 may facilitate removal of the removable sprinkler protection device 100 from the sprinkler 105. The release tab portion 155 may be positioned such that a force (e.g., push or pull) on the release tab portion 155 causes a quick release of the folded unitary member 120 from the sprinkler 105. For example, the release tab portion 155 may facilitate unfolding the folded unitary member 120 after the sprinkler 105 has been installed. In some examples, a user may pull the release tap portion 155 which causes at least one side portion of the folded unitary member 120 (e.g., the third sidewall 145) from another portion of the folded unitary member 120 (e.g., the fourth sidewall 150) such that an opening, channel, or the like is formed between the portions allowing the sprinkler 105 to pass. In some examples, the release tab portion 155 may facilitate breaking one or more portions of the folded unitary member 120 to remove the folded unitary member 120 from the sprinkler 105. For example, the folded unitary member 120 may include a perforation extending completely around a portion of the folded unitary member 120 (e.g., from the top side 125 to the bottom side 130) such that pulling the release tab portion 155 causes the folded unitary member 120 to break open at the perforation.

The folded unitary member 120 can include at least one opening. For example, the folded unitary member 120 can include a top opening 160 (e.g., an opening on the top side

125) or a bottom opening 160 (e.g., an opening on the bottom side 130). In some examples, the folded unitary member 120 may include openings on any of the sidewalls. In some examples, the folded unitary member 120 can include more than two openings (e.g., in alternative to or in addition the top opening 160 and the bottom opening 160). The opening can receive a portion of the sprinkler 105. For example, the top opening 160 can receive a portion of the top end 110 of the sprinkler 105 or the bottom opening 160 can receive a portion of the bottom end 115 of the sprinkler 105. In some examples, the opening can receive a portion of the sprinkler 105 such that at least one portion of the sprinkler 105 is exposed outside of the folded unitary member 120, as depicted in FIG. 1. In some examples, the sprinkler 105 may not be exposed outside of the folded unitary member 120. In some examples, the folded unitary member 120 may not include any openings (e.g., such that the folded unitary member 120 completely surrounds the sprinkler 105.

The folded unitary member 120 can be made at least partially of a biodegradable material. For example, the folded unitary member 120 may include at least one portion that is a biodegradable material such as cardboard, cork, bamboo, mycelium, or similar materials. In some examples, the folded unitary member is not made from plastic (e.g., does not include any plastic materials). In some examples, the biodegradable material is recycled cardboard.

The folded unitary member 120 can include a plurality of perforations (visible in FIG. 2 and described below) that separate each side of the folded unitary member 120 from one another. For example, the folded unitary member 120 can be folded at the plurality of perforations.

The folded unitary member 120 can include at least one projection that can extend towards or away from one or more portions of the sprinkler 105. For example, at least one side of the folded unitary member 120 (e.g., the third sidewall 145) can include a projection 175 that can extend inward (e.g., toward the sprinkler 105) or outward (e.g., away from the sprinkler). In some examples, the projection 175 a perforation facilitates the projection 175 extending towards the sprinkler 105. For example, the one or more projections 175 can extend inward via folding the projection 175 at the perforation (e.g., perforation 180). In some examples, the folded unitary member 120 can include a plurality of projections 175. In some examples, the folded unitary member 120 can include on projection 175. In still some examples, the folded unitary member 120 may not include any projections 175.

The plurality of projections 175 can facilitate holding one or more portions of the sprinkler 105 in place. For example, each of the one or more projections 175 can extend inward and support or engage with a portion of the sprinkler to reduce movement (e.g., vibration, lateral movement, longitudinal movement) to facilitate reducing damage to the sprinkler 105 with installation. In some examples, each of the one or more projections 175 may be equal in size or shape. In some examples, each of the one or more projections 175 may differ in size or shape. The plurality of projections 175 can facilitate reducing debris from damaging one or more portions of the sprinkler 105. For example, at least one projection 175 may extend outward (e.g., away from the sprinkler 105) to facilitate directing debris away from the sprinkler 105. The projection 175 may also facilitate supporting the structural integrity of the removable sprinkler protection device 100. For example, the projection 175 may extend outward such that the projection 175 may engage with a nearby object or other similar force outside of the folded unitary member 120 to facilitate maintaining the structural integrity of the folded unitary member 120 (e.g., during transportation of the folded unitary member 120 or the sprinkler 105 or during installation of the sprinkler 105).

The folded unitary member 120 can include at least one image 165 (e.g., graphic, text, or the like) on the folded unitary member 120. For example, the image 165 may include an indication to recycle or compost the folded unitary member 120 after removal from the sprinkler 105. In some examples, the image 165 may include one or more instructions including an indication to remove the folded unitary member 120 from the sprinkler 105 after the sprinkler 105 is installed. In some examples, one or more images 165 of the folded unitary member 120 may include an indication to pull or push the release tab portion 155 to remove the folded unitary member 120 from the sprinkler 105.

The folded unitary member 120 can include one or more colors, textiles, graphics, or similar components. For example, as described in greater detail below, the folded unitary member 120 can include one or more colored portions that separate the folded unitary member 120 and the image 165. In some examples, various biodegradable inks or dyes may be used to provide the various colored portions. For example, the image 165 and other portions of the folded unitary member 120 may be made from soy ink.

The removable sprinkler protection device 100 may vary in size or shape to accommodate a variety of sprinklers 105. For example, in one example implementation, the removable sprinkler protection device 100 may include a length of about 4.5 millimeters (e.g., from the first sidewall 135 to the second sidewall 140), a height of about 2.5 millimeters (e.g., from the top side 125 to the bottom side 130), and a depth of about 1 millimeters (e.g., from the third sidewall 145 to the fourth sidewall 150). These dimensions are for illustrative purposes only and is not intended to limit the scope of the present disclosure. The dimensions (and shape) of the removable sprinkler protection device 100 may be significantly different than those described.

FIG. 2 depicts an example of a foldable unitary member 200. For example, the foldable unitary member 200 depicted in FIG. 2 may be or may include the same features of the folded unitary member 120 depicted in FIG. 1 in an unfolded state (e.g., not surrounding the sprinkler 105). The foldable unitary member 200 can include a first portion 205 having a first extension 210, a second extension 215, a third extension 220, and a fourth extension 225. For example, the first portion 205 may make up a portion of the fourth sidewall 150 shown in FIG. 1 and among others. In some examples, the first extension 210 may make up a portion of the top side 125 of the folded unitary member 120. The second extension 215 may make up a portion of the bottom side 130 of the folded unitary member 120. The third extension 220 may make up a portion of the first sidewall 135 of the folded unitary member 120. The fourth extension 225 may make up a portion of the second sidewall 140 of the folded unitary member 120.

The foldable unitary member 200 can include a second portion 230 having a fifth extension 235, a sixth extension 240, and a seventh extension 245. For example, the second portion 230 may make up a portion of the third sidewall 145 of the folded unitary member 120. The fifth extension 235 may make up a portion of the top side 125 of the folded unitary member 120. For example, the fifth extension 235 may fold into a portion of the first extension 210 to make up the top side 125, as described in greater detail below. The sixth extension 240 may make up a portion of the bottom side 130 of the folded unitary member 120. For example, the sixth extension 240 may fold into a portion of the second extension 215 to make up the bottom side 130. The seventh extension 245 may make up a portion of the first sidewall 135 of the folded unitary member 120. For example, the seventh extension 245 may fold into a portion of the third extension 220 to make up the first sidewall 135. The fourth extension 225 of the foldable unitary member 200 may position at least partially between the first portion 205 and the second portion 230. For example, the fourth extension 225 may couple or join the first portion 205 and the second portion 230.

In some examples, the seventh extension may include at least one tab 275. For example, the tab 275 may be or may include the release tab portion 155 of the folded unitary member 120. As described above, the foldable unitary member 200 may include a plurality of perforations 280 to facilitate folding the foldable unitary member 200. For example, the perforations 280 may separate each portion or extension from one another such that folding the foldable unitary member 200 at each perforation 280 creates the folded unitary member 120.

In some examples, one or more portions of the foldable unitary member 200 may include an opening 290. For example, as described above with reference to FIG. 1, the opening 290 may receive a portion of the sprinkler 105 with installation of the foldable unitary member 200 on the sprinkler 105. In some examples, the first extension 210 and the fifth extension 235 may each include an opening 290 (e.g., aperture, divot, slot, etc.) to receive a portion of the sprinkler 105, such as the top end 110 of the sprinkler 105. The second extension 215 and the sixth extension 240 may include an opening 290 to receive another portion of the sprinkler 105, such as the bottom end 115 of the sprinkler 105. For example, at least one opening 290 may make up a portion of the top opening 160 and at least one opening 290 may make up a portion of the bottom opening 160.

In some examples, the foldable unitary member 200 may include at least one flap 285. For example, the flap 285 may include a perforation 280 along one portion of the flap 285 (e.g., the perforation 180 depicted in at least FIG. 1) such that the flap 285 can be pushed inward or pulled outward to form a projection (e.g., the projection 175 depicted in FIG. 1 and among others). In some examples, the foldable unitary member 200 may include one flap 285. In some examples, the foldable unitary member 200 may include more than one flap 285. In still some examples, the foldable unitary member 200 may include more or less flaps 285.

The foldable unitary member 200 can be made from a biodegradable material as described above. For example, the foldable unitary member 200 may include at least one portion that is a biodegradable material such as cardboard, cork, bamboo, mycelium, or similar materials. In some examples, the folded unitary member is not made from plastic (e.g., does not include any plastic materials). In some examples, the biodegradable material is recycled cardboard.

The foldable unitary member 200 can include at least one image 265 (e.g., graphic, text, or the like) on the foldable unitary member 200, as described above. For example, the image 265 may include an indication to recycle or compost the foldable unitary member 200 after removal from the sprinkler 105. In some examples, the image 265 may include one or more instructions including an indication to remove the foldable unitary member 200 from the sprinkler 105 after the sprinkler 105 is installed. In some examples, one or more images 265 of the foldable unitary member 200 may include an indication to pull or push the tab 275 to remove the folded unitary member 120 from the sprinkler 105 (e.g., when the folded unitary member 120 is formed, after installation of the sprinkler 105).

The foldable unitary member 200 can include one or more colors, textiles, graphics, or similar components, as described above. For example, the foldable unitary member 200 can include one or more colored portions that separate the foldable unitary member 200 and the image 265. For example, the foldable unitary member 200 may include a first portion 250 that does not include any dyes or colors (e.g., plain cardboard) and a second portion 255 that does include dyes or colors (e.g., soy ink on cardboard). In some examples, various biodegradable inks or dyes may be used to provide the various colored portions. For example, the image 265 and other portions of the foldable unitary member 200 may be made from soy ink.

Figure 7:
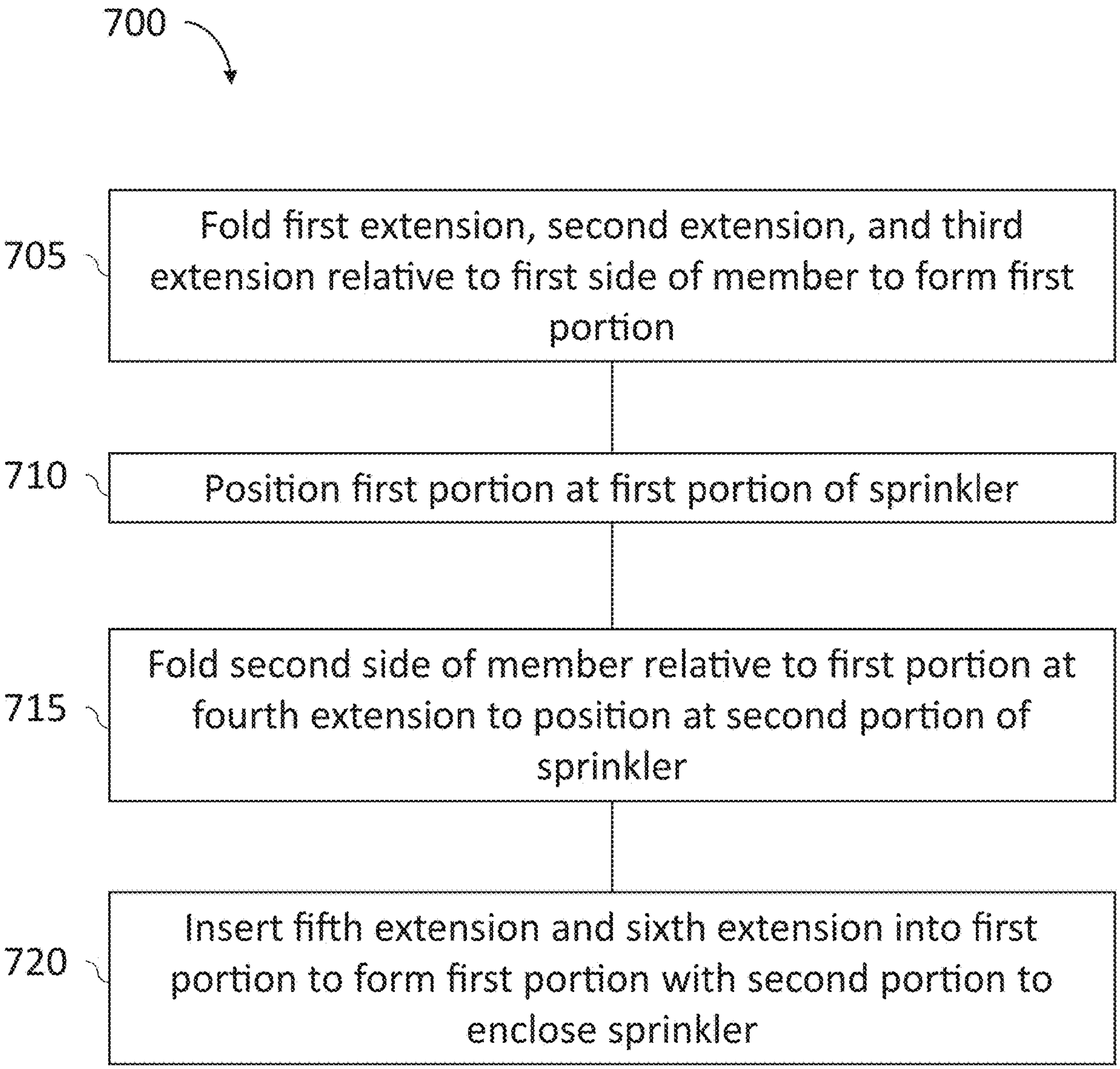
FIG. 7 is an illustration of an example of a method of installing a sprinkler protection device, in accordance with an implementation.

FIG. 7 depicts an illustration of a method 700 of installing the removable sprinkler protection device 100. The method 700 will be described in reference to FIGS. 3-6. The method 700 can include folding the first extension 210, the second extension 215, and the third extension 220 of the foldable unitary member 200 to form a first portion 305 (e.g., to form a first half of the top side 125, a first half of the bottom side 130, and the third sidewall 145 of the folded unitary member 120), as depicted in act 705. For example, the first extension 210 may be folded in half (e.g., along a perforation) to form the first half of the top side 125 of the folded unitary member 120. In a similar manner, the second extension 215 may be folded in half (e.g., along a perforation) to form the first half of the bottom side 130 of the folded unitary member 120. Accordingly, the first portion 205, the first half of the top side 125, and the first half of the bottom side 130 can form a first portion 305, as depicted in at least FIG. 3.

Figure 3:
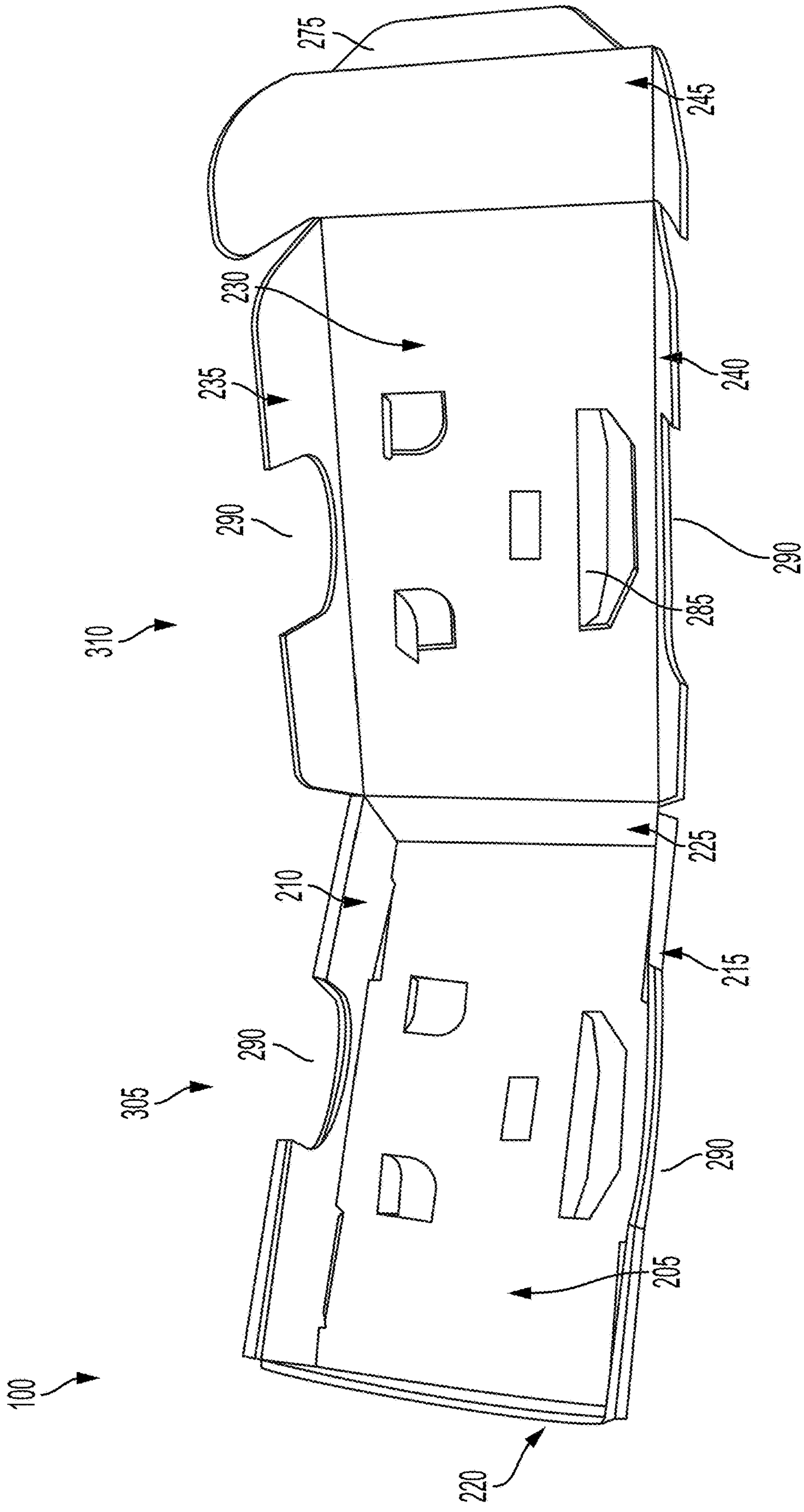
FIG. 3 is an interior view of the sprinkler protection device of FIG. 2 in a partially folded state, in accordance with an implementation.
Figure 4:
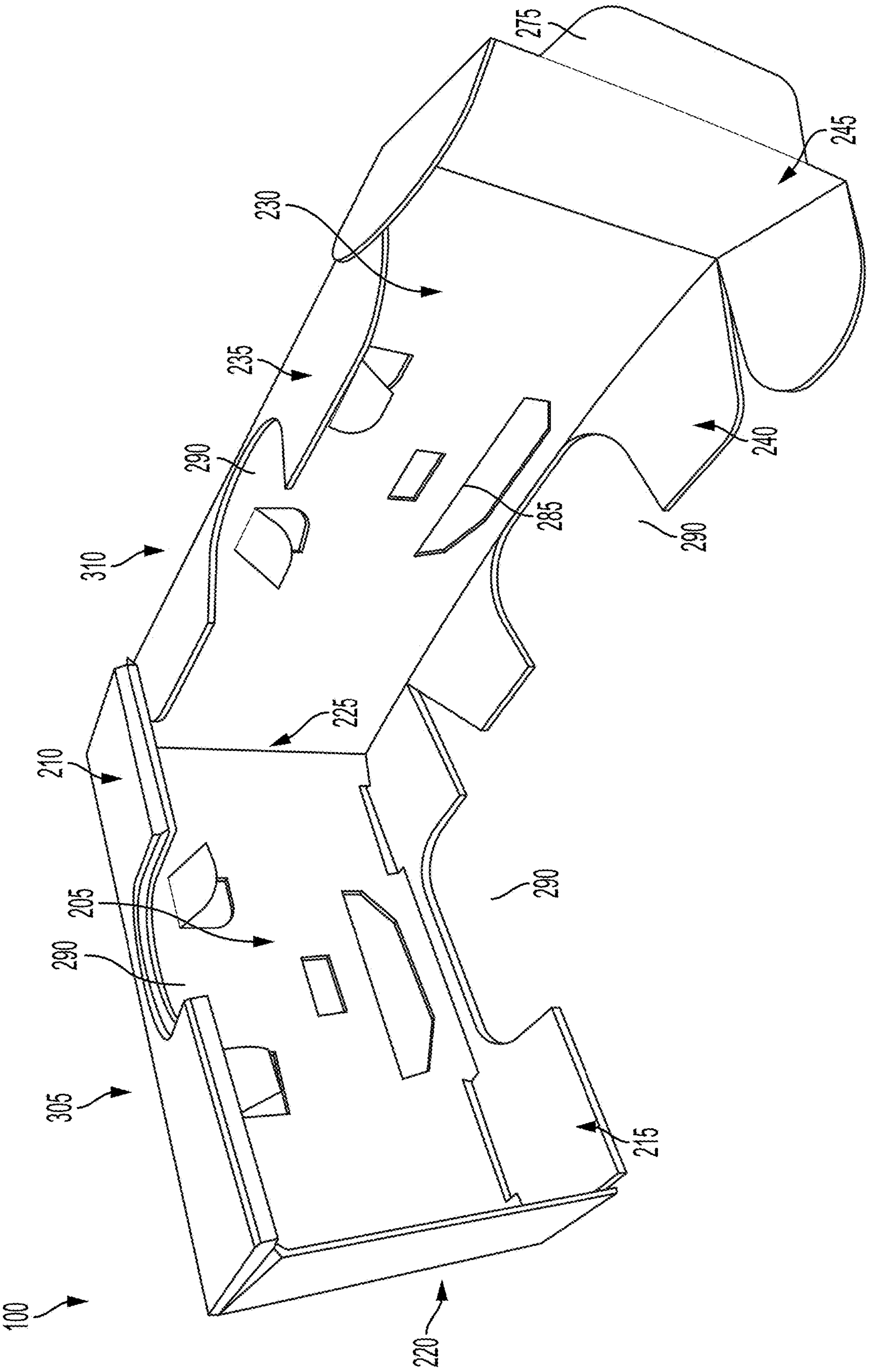
FIG. 4 is an interior view of the sprinkler protection device of FIG. 2 in a partially folded state, in accordance with an implementation.
Figure 5:
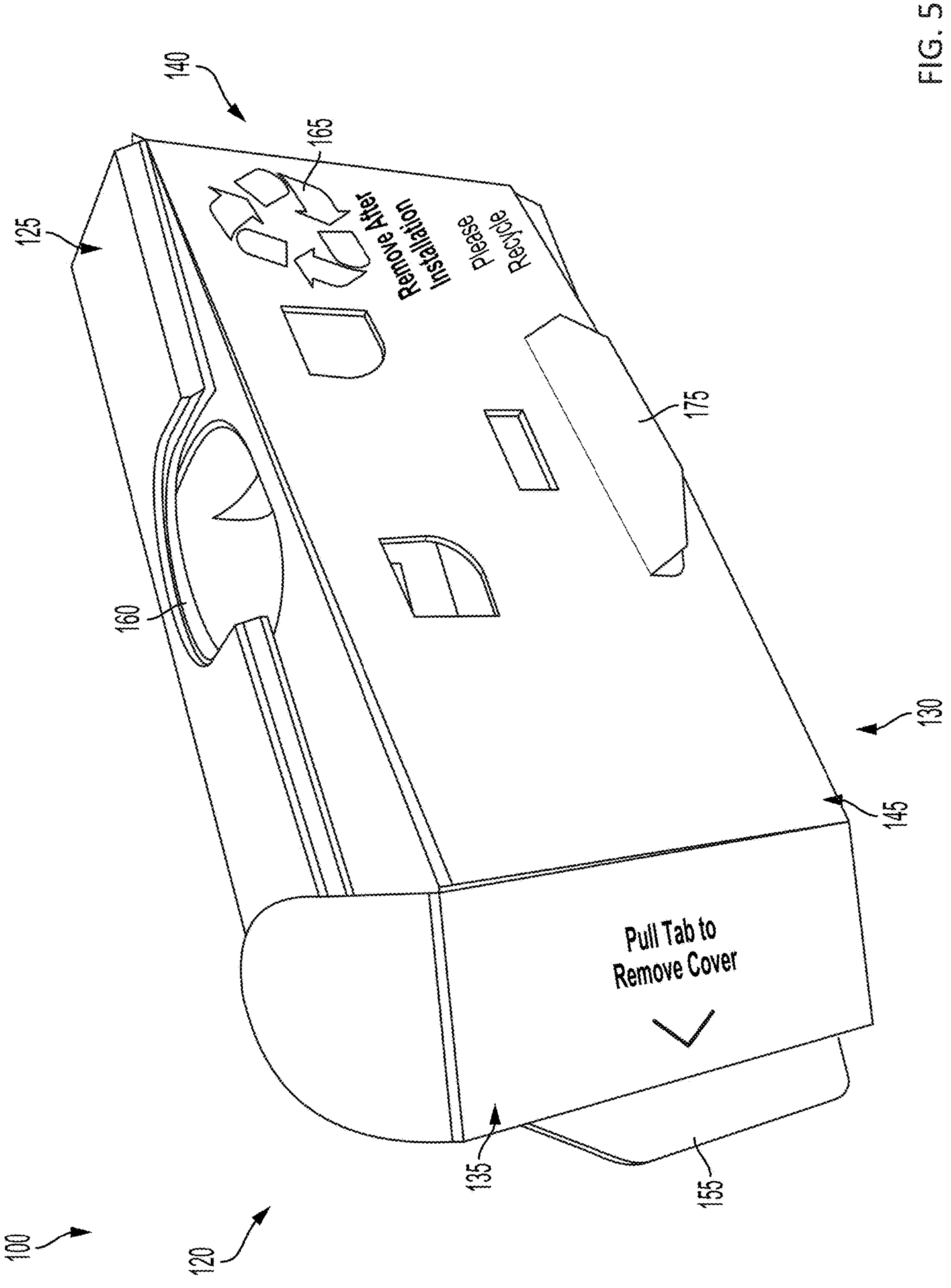
FIG. 5 is an exterior view of the sprinkler protection device of FIG. 2 in a partially folded state, in accordance with an implementation.
Figure 6:
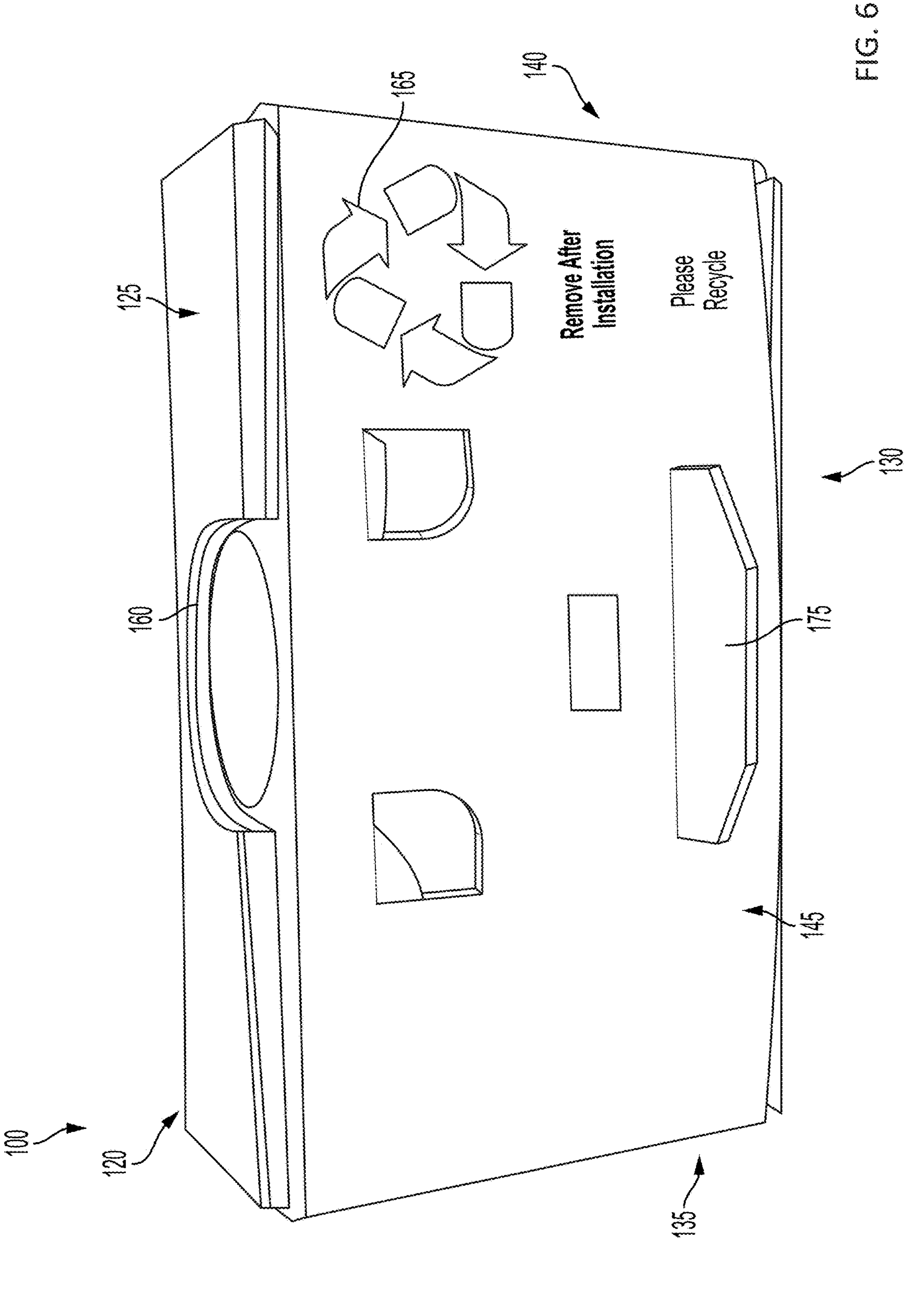
FIG. 6 is an exterior view of the sprinkler protection device of FIG. 2 in a folded state, in accordance with an implementation.

The method 700 can include positioning the first portion 305 of the removable sprinkler protection device 100 (e.g., the partially folded unitary member) at a first portion of the sprinkler 105, as depicted in act 710. For example, as depicted in FIG. 1, at least a portion of the removable sprinkler protection device 100 can surround the sprinkler 105. As depicted in FIGS. 3 and 4, and among others, the first portion 305 of the partially folded device can position at a first portion of the sprinkler 105 (e.g., such that at least one opening 290 of the first portion 305 receives one or more portions of the sprinkler 105).

The method 700 can include folding a second side (e.g., the second portion 230 of the foldable unitary member 200) of the removable sprinkler protection device 100 relative to the first portion 305 at the fourth extension 225 such that the second side of the partially folded unitary member of the removable sprinkler protection device 100 positions at a second portion of the sprinkler 105, as depicted in act 715. For example, as depicted in at least FIG. 4, the removable sprinkler protection device 100 can fold relative to the fourth extension 225 (e.g., along one or more perforations) such that the second portion 230 can face a portion of the first portion 205 of the foldable unitary member 200.

The method 700 can include inserting the fifth extension 235 and the sixth extension 240 of the second portion of the second portion 230 of the foldable unitary member 200 into a portion of the first portion 305 of the removable sprinkler protection device 100 to form a second portion 310 of the removable sprinkler protection device 100 that couples with the first portion 305 to enclose the sprinkler 105, as depicted in act 720. For example, as shown in at least FIGS. 4-6, the fifth extension 235, the sixth extension 240, and one or more portions of the seventh extension 245 into a portion of the first portion 305 of the removable sprinkler protection device 100 such that the folded unitary member 120 forms the removable sprinkler protection device 100, as shown in at least FIGS. 5 and 6.

In some examples, the method 700 can include pushing or pulling the one or more flaps 285 of the foldable unitary member 200 towards or away from the sprinkler 105 (e.g., to form the projections 175 with the folded unitary member 120 coupled to the sprinkler 105. In some examples, the method 700 can include pushing or pulling a flap 285 positioned on a first portion 205 of the foldable unitary member 200 (e.g., on the third sidewall 145). In some examples, the method 700 can include pushing or pulling a flap 285 positioned on the second portion 230 of the foldable unitary member 200 (e.g., on the fourth sidewall 150).

In some examples, the method 700 can include pulling a release tab portion 155 to unfold a first portion 305 of the removable sprinkler protection device 100 relative to the second portion 310 of the removable sprinkler protection device 100. For example, a force on the release tab portion 155 can remove the fifth extension 235 and the sixth extension 240 from within a portion of the first portion 305 of the removable sprinkler protection device 100 such that the second portion 310 of the removable sprinkler protection device 100 is removed from the first portion 305 such that the sprinkler 105 can pass from the removable sprinkler protection device 100 (e.g., to return to the state shown in FIG. 3 or 4.

In some examples, the method 700 can include removing the removable sprinkler protection device 100 from the sprinkler 105. For example, after the sprinkler 105 is installed, the removable sprinkler protection device 100 may be removed from the sprinkler 105. In some examples, the method 700 can include recycling or composting the removable sprinkler protection device 100. For example, as described above, the removable sprinkler protection device 100 may include one or more biodegradable materials such that the removable sprinkler protection device 100 may be recycled after removal from the sprinkler 105.

Figure 8:
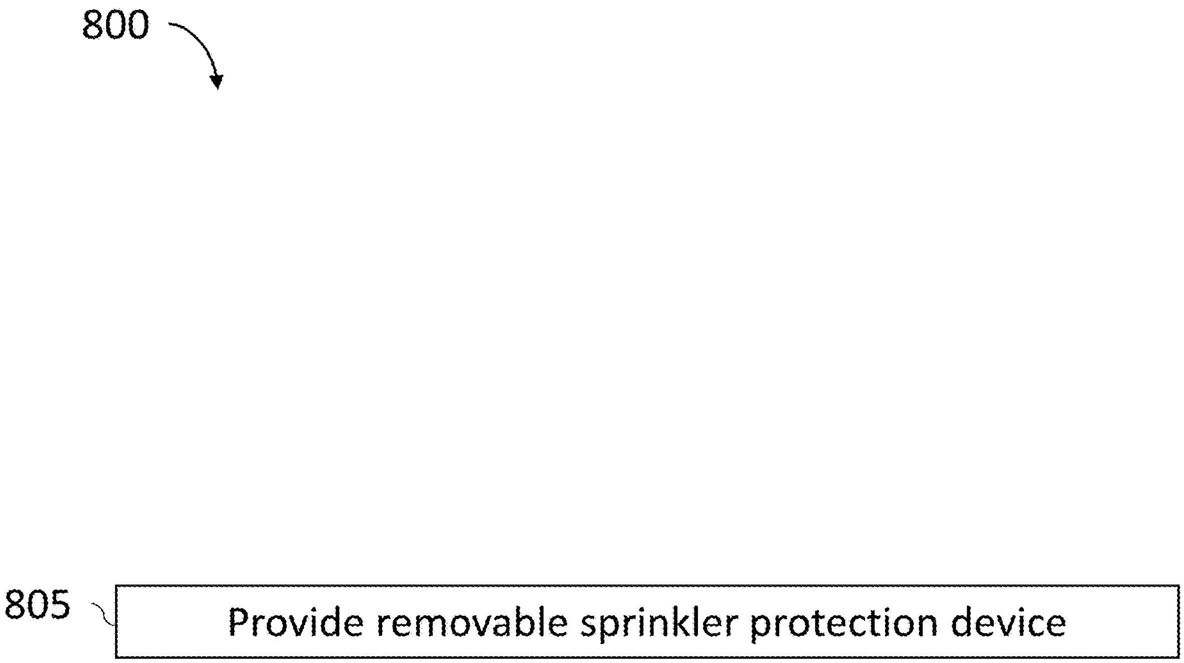
FIG. 8 is an illustration of an example of a method of installing a sprinkler protection device, in accordance with an implementation.

FIG. 8 depicts an example of an illustration of method 800 of installing a removable sprinkler protection device 100. For example, the method 800 can include providing the removable sprinkler protection device 100, as depicted at act 805. As shown throughout the figures, the removable sprinkler protection device 100 may include the foldable unitary member 200. The foldable unitary member 200 can include the first portion 205 having the first extension 210, the second extension 215, the third extension 220, and the fourth extension 225. The foldable unitary member 200 can include the second portion 230 having the fifth extension 235, the sixth extension 240, and the seventh extension 245. The fourth extension 225 may be disposed at least partially between the first portion 205 and the second portion 230. The seventh extension 245 can include the tab 275. The first portion 205 or the second portion 230 may include one or more openings 290. The removable sprinkler protection device 100 may include or may be formed of biodegradable material.

Figure 9:
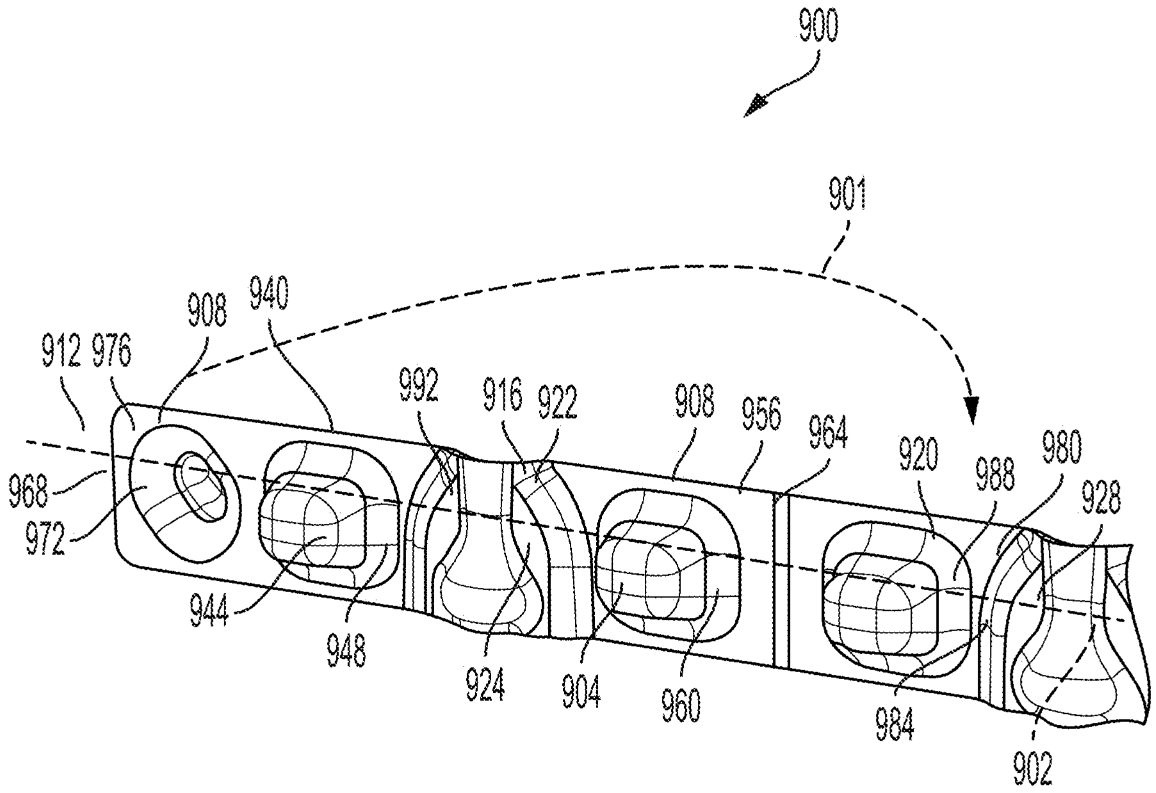
FIG. 9 is a perspective view of an example of a sprinkler protection device, in accordance with an implementation.
Figure 10:
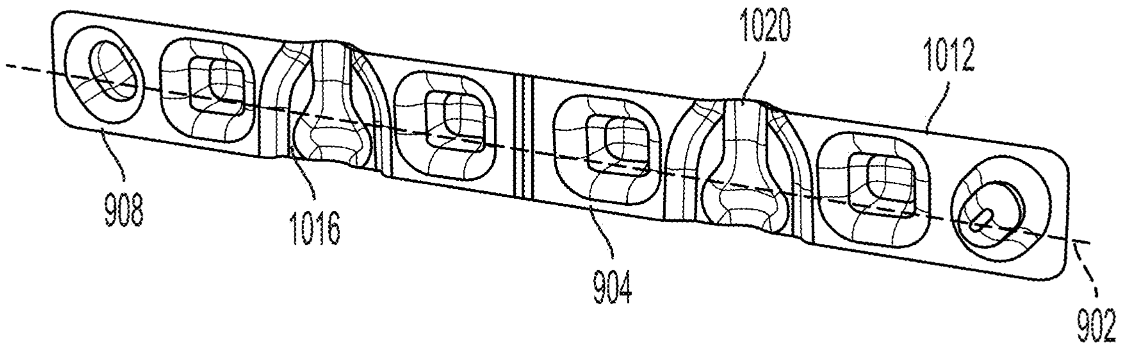
FIG. 10 is a perspective view of an example of a sprinkler protection device, in accordance with an implementation.
Figure 11:
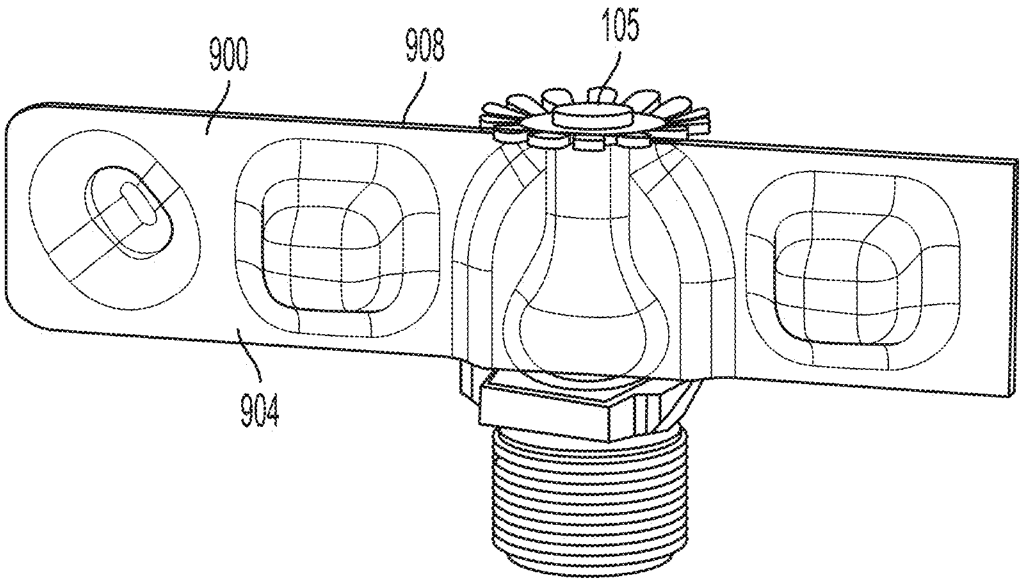
FIG. 11 is a perspective view of an example of a sprinkler coupled with a sprinkler protection device, in accordance with an implementation.
Figure 12:
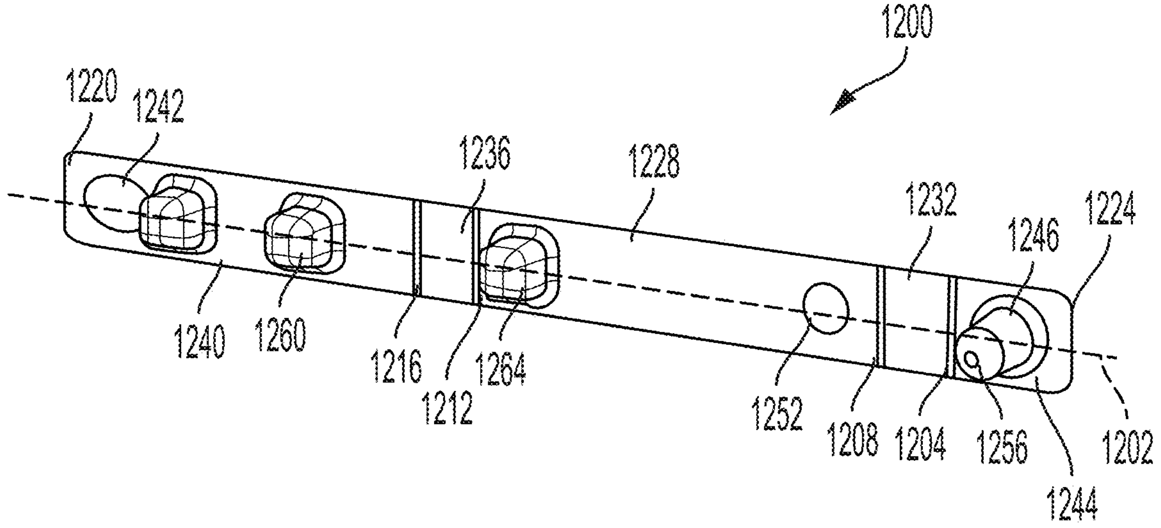
FIG. 12 is a perspective view of an example of a sprinkler protection device, in accordance with an implementation.
Figure 13:
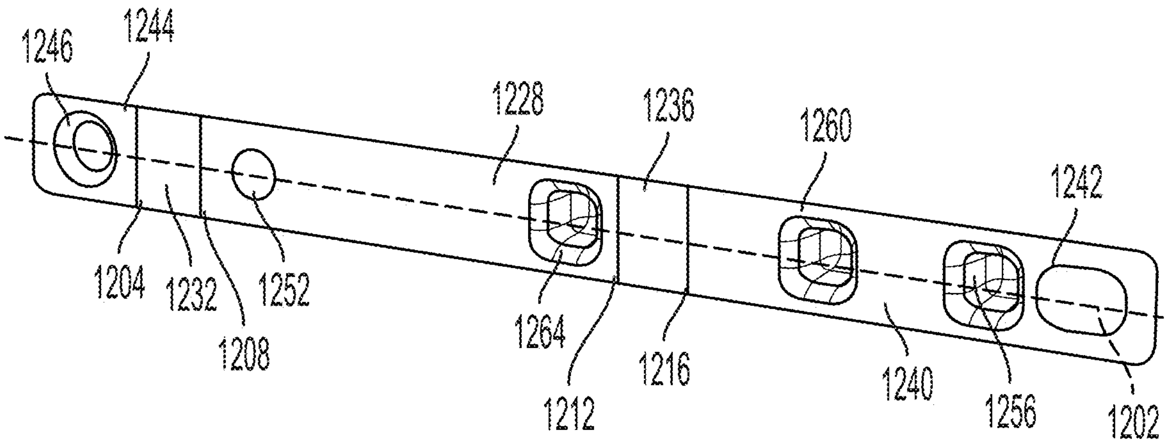
FIG. 13 is a perspective view of an example of a sprinkler protection device, in accordance with an implementation.

FIGS. 9-11 depict an example of a device 900 (e.g., sprinkler protection device) to couple with a sprinkler 105. The device 900 can incorporate features of various devices described herein, including the foldable unitary member 120. The device 900 can be made of biodegradable material, such as a pulp material. For example, the device 900 can be made of at least one of paper, pulp, wood pulp, pulp fiber, cellulose fiber, paper pulp, or cardboard. The device 900 can be made of a pulp from recycled paper-based materials such as paper, wood, or cardboard.

The device 900 can include a first surface 904 extending along an axis 902 (e.g., longitudinal axis). The device 900 can have a first side 908 (e.g., first portion) extending along the axis 902 between a first outer end 912 and a first inner end 916 and a second side 920 (e.g., second portion) extending between a second inner end 922 and a second outer end 928.

The device 900 can include a joint 924 between the first side 908 and the second side 920. The joint 924 can be a hinge. The joint 924 can allow for the first side 908 and the second side 920 to respectively be rotated (e.g., bent, folded) relative to the joint 924 (e.g., to rotate first side 908 towards second side 920 along direction 901 about the joint 924 or an axis aligned with the joint 924 transverse to the axis 902). For example, the joint 924 can be formed from relatively thinner material, perforated material, pre-folded material, or various combinations thereof to facilitate securing the device 900 around the sprinkler 105.

The device 900 can include at least one sprinkler receiver 940, 956. The sprinkler receivers 940, 956 can be arranged and shaped to receive the sprinkler 105 to prevent damage to the sprinkler 105 and components thereof. The sprinkler receivers 940, 956 can extend outward relative to the first surface 904 to define respective chambers 1016, 1020 for receiving the sprinkler 105. For example, as depicted in FIG. 10, the device 900 can have a second surface 1004 opposite the first surface 904; the chambers 1016, 1020 can extend away from second surface 1004 as concave structures to receive the sprinkler 105 between the chambers 1016, 1020.

As depicted in FIG. 9, the sprinkler receivers 940, 956 can each include a respective central portion 944, 960 having a first portion (closer to a top edge of the device 900 in the frame of reference of FIG. 9) and a second portion having a greater diameter than the first portion to correspond with a shape of the sprinkler 105.

The sprinkler receivers 940, 956 can include respective outer portions 948, 964 around the central portions 944, 960 to receive frame arms of the sprinkler 105. The outer portions 948, 960 can extend less far outward from the first surface 904 than the central portions 944, 956.

The sprinkler receivers 940, 956 can be substantially equidistant from the joint 924, so that responsive to folding of the first side 908 and the second side 920 about the joint 924, the sprinkler receivers 940, 956 can face one another to form a housing around the sprinkler 105 to support the sprinkler 105. The sprinkler receivers 940, 956 can be substantially congruent or identical in shape to facilitate arranging the sprinkler 105 against one or both sprinkler receivers 940, 956 for packaging.

The device 900 can include a first fastener 968 and a second fastener 980. The fasteners 968, 980 can be positioned towards the outside of the device 900 relative to the joint 924, such as to be further outward from the joint 924 than the sprinkler receivers 940, 956, which can facilitate a secure coupling of the device 900 about the sprinkler 105. The first fastener 968 can be coupled with the second fastener 980 responsive to rotation of at least one of the first side 904 and the second side 908 relative to the joint 924. The first fastener 968 can be shaped to be received by the second fastener 980. For example, the first fastener 968 can include an outer member 972 and an inner member 976 inward from the outer member 972. The second fastener 980 can include an outer member 984 and an inner member 988 inward from the outer member 984. The outer member 972 can be shaped to be received by the outer member 984 and the inner member 976 can be shaped to be received by the inner member 988. Relative to a frame of reference of the first surface 904 (e.g., the frame of reference of FIG. 9), the outer member 972 can have a concave curvature that transitions to a convex curvature of the inner member 976; relative to a frame of reference of the second surface 1004 (e.g., the frame of reference of FIG. 10), the outer member 984 can have a concave curvature that transitions to a convex curvature of the inner member 988.

The device 900 can include at least one buffer 992. The buffers 992 can extend outward from the first surface 904. As depicted in FIG. 9, the buffers 992 can be arranged on each side of the sprinkler receivers 940, 956; for example, the buffers 992 can include at least one buffer 992 between respective sprinkler receivers 940, 956 and the joint 924, and at least one buffer 992 between respective sprinkler receivers 940, 956 and the fasteners 968, 980.

FIGS. 12-15 depict an example of a device 1200 (e.g., sprinkler protection device) to couple with the sprinkler 105. The device 1200 can incorporate features of various devices described herein, such as the foldable unitary member 120 and the device 900. The device 1200 can be made of biodegradable material, such as a pulp material. For example, the device 1200 can be made of at least one of paper, pulp, wood pulp, pulp fiber, cellulose fiber, paper pulp, or cardboard. The device 1200 can be made of a pulp from recycled paper-based materials such as paper, wood, or cardboard. The device 1200 can be a five panel member.

Figure 14:
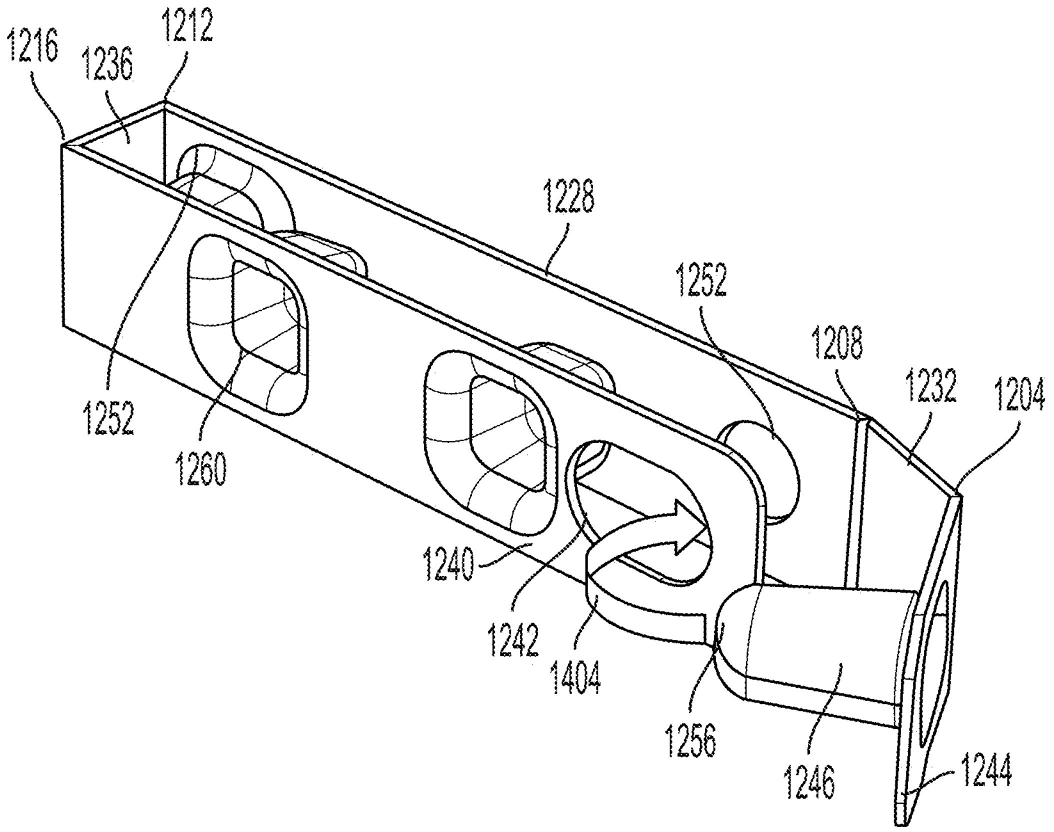
FIG. 14 is a perspective view of an example of a sprinkler protection device in a partially folded state, in accordance with an implementation.
Figure 15:
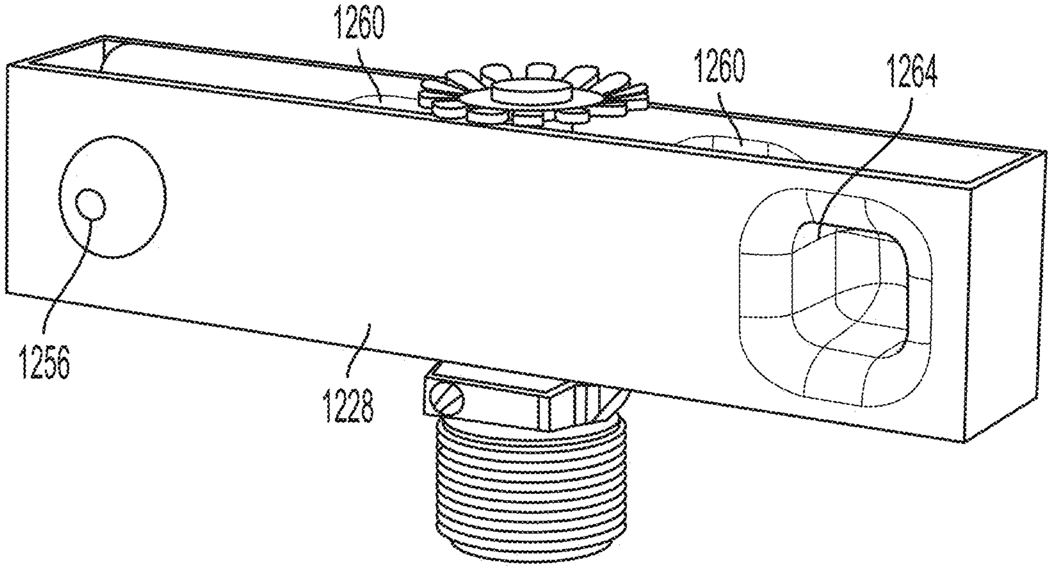
FIG. 15 is a perspective view of an example of a sprinkler coupled with a sprinkler protection device, in accordance with an implementation.

The device 1200 can include a plurality of joints 1204, 1208, 1212, 1216 (i.e., first joint 1204, second joint 1208, third joint 1212, fourth joint 1216). For example, the joints 1204, 1208, 1212, 1216 can be four joints to enable the device 1200 to be arranged as a five panel member. The joints 1204, 1208, 1212, 1216 can extend transverse to a longitudinal axis 1202 of the device 1200. The joints 1204, 1208, 1212, 1216 can be similar or identical to the joint 924 described with reference to FIG. 9 to allow for the device 1200 to be rotated about each respective joint 1204, 1208, 1212, 1216 to form a deployed (e.g., folded) state of the device 1200 as depicted in FIGS. 14 and 15. The joints 1204, 1208, 1212, 1216 can be grooved hinges, such as v-groove hinges.

The joints 1204, 1208, 1212, 1216 can be arranged with particular spacing along the device 1200 to form portions of the device 1200 for positioning around the sprinkler 105. For example, the device 1200 can extend from a first end 1220 to a second end 1224, and the first joint 1204 and second joint 1208 can be proximate the second end 1224 relative to the third joint 1212 and fourth joint 1216. A distance between the second joint 1208 and the third joint 1212 can be greater than a distance between the first joint 1204 and the second joint 1208, such that a first portion 1228 of the device 1200 is longer than a second portion 1232. A distance between the third joint 1212 and the fourth joint 1216 can be substantially equal to the distance between the first joint 1204 and the second joint 1208, such that a third portion 1236 of the device 1200 is lesser in length than the second portion 1228 and a fourth portion 1240 (from the fourth joint 1216 to the first end 1220).

The device 1200 can have a fifth portion 1244 between the first joint 1204 and the second end 1224. The fifth portion 1244 can be shorter than the second portion 1228 and the fourth portion 1240. The device 1200 can have a fastener 1246 that extends outward from a surface of the fifth portion 1244. The fastener 1246 can be cylindrical.

As depicted in FIG. 14, the fifth portion 1244 can be sized and the fastener 1246 can be shaped so that at least a portion of the fastener 1246 can be rotated (e.g., in direction 1404) and received through an opening 1242 of the fourth portion 1240 to engage the device 1200 in the folded state. The second portion 1228 can define an opening 1252 to receive a tip 1256 of the fastener 1246. The opening 1252 can have a lesser perimeter and/or diameter than the opening 1242, and the fastener 1246 can decrease in diameter from the surface of the fifth portion 1244 to the tip 1256; the opening 1242 can have a lesser perimeter than a perimeter of the fastener 1246 inward from the tip 1256 to engage the fastener 1246. A center of the opening 1252 can be about equidistant from the joint 1208 as a center of the opening 1242 and a center of the tip 1256, so that the fastener 1246 can be aligned for insertion through the opening 1242 and to engage the opening 1252.

Referring further to FIGS. 12-15, the device 1200 can include a plurality of sprinkler engagement members 1260 extending outward from the fourth portion 1240. The sprinkler engagement members 1260 can extend in a same direction as the fastener 1246. The sprinkler engagement members 1260 can be equidistant about a center of the fourth portion 1240, and closer to the center of the fourth portion 1240 relative to a buffer 1264 extending from the third portion 1228 (the buffer 1264 can be shaped similarly or identically to the sprinkler engagement members 1260; the buffer 1264 can be closer to the third joint 1212 than the sprinkler engagement members 1260 are positioned relative to the fourth joint 1216). As depicted in FIG. 15, the sprinkler 105 can be received between the sprinkler engagement members 1260.

Figure 16:
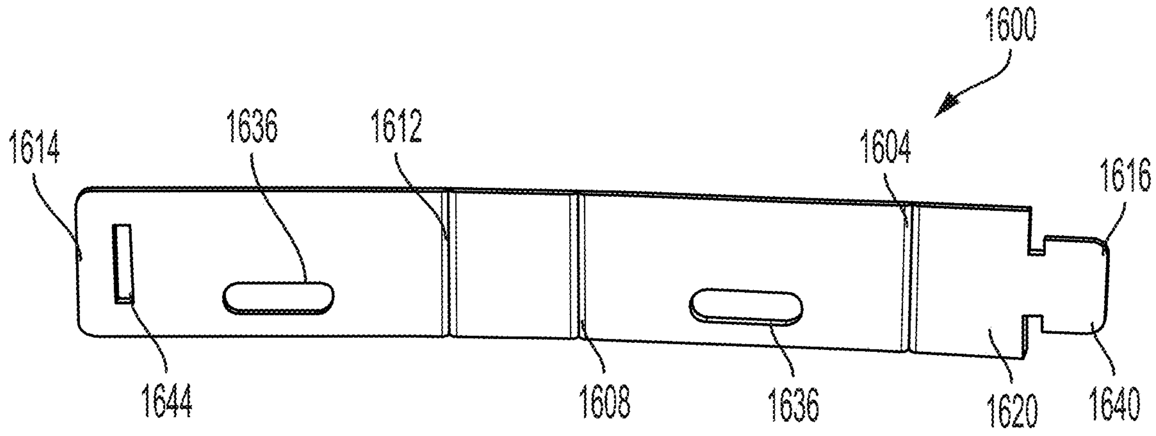
FIG. 16 is a perspective view of an example of a sprinkler protection device, in accordance with an implementation.
Figure 17:
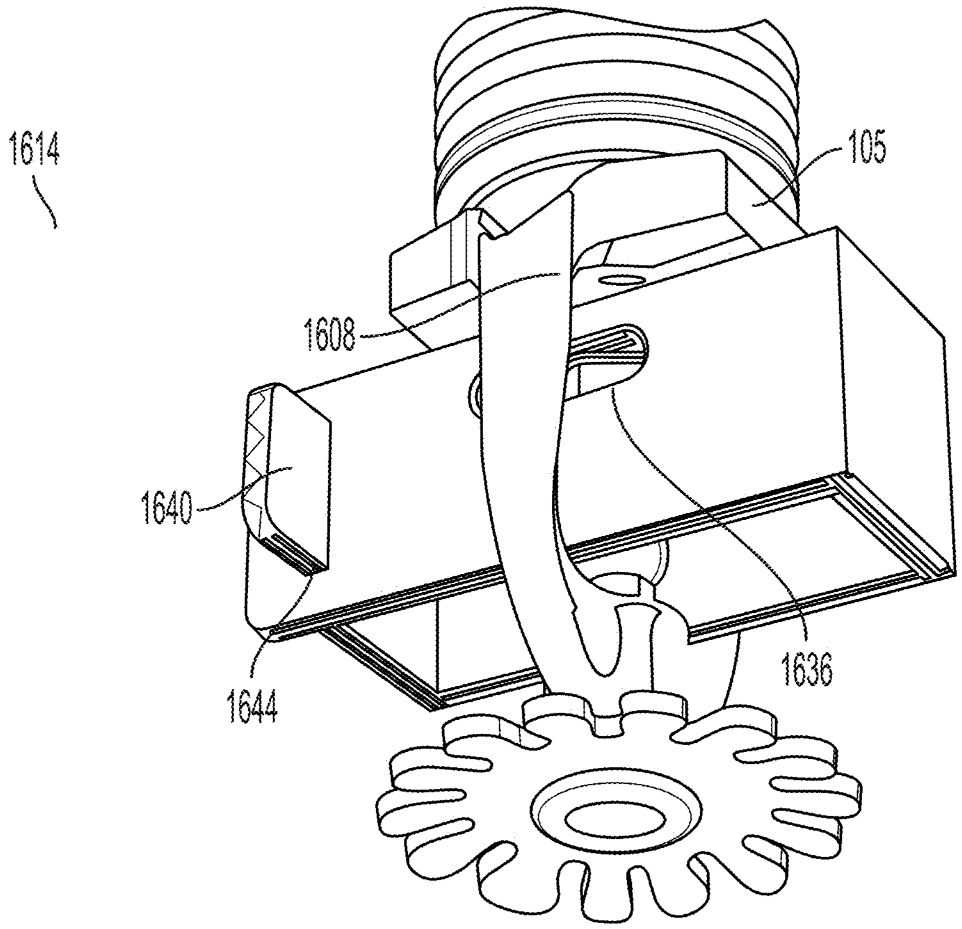
FIG. 17 is a perspective view of an example of a sprinkler coupled with a sprinkler protection device, in accordance with an implementation.

FIGS. 16 and 17 depict an example of a device 1600 (e.g., sprinkler protection device) to couple with the sprinkler 105. The device 1600 can incorporate features of various devices described herein, including the foldable unitary member 120, device 900, and device 1200 (e.g., by having multiple panels joined by hinge joints). The device 1600 can be made of biodegradable material, such as a pulp material. For example, the device 1600 can be made of at least one of paper, pulp, wood pulp, pulp fiber, cellulose fiber, paper pulp, or cardboard. The device 1600 can be made of a pulp from recycled paper-based materials such as paper, wood, or cardboard. The device 1600 can form an interlock to support the sprinkler 105, such as to provide protection of a thermal trigger of the sprinkler 105 through open sides where the sprinkler head may not have columns to interfere with the walls of the device 1600.

As depicted in FIG. 16, the device 1600 can include a plurality of joints 1604, 1608, 1612 (e.g., first joint 1604, second joint 1608, third joint 1612). The plurality of joints 1604, 1608, 1612 can be similar to the joints 1204, 1208, 1212, 1216 to form a first portion 1620 between a second end 1616 of the device 1600 and the first joint 1604, a second portion 1624 between the first joint 1604 and the second joint 1608, a third portion 1628 between the second joint 1608 and the third joint 1612, and a fourth portion 1632 between the third joint 1612 and a first end 1614 of the device 1600.

The second portion 1624 and the fourth portion 1632, as depicted in FIG. 16, can be longer than the third portion 1628 (and may also be longer than the first portion 1620). The second portion 1624 and the fourth portion 1632 can each include a respective slot 1636 sized to receive a structure of the sprinkler 105 as depicted in FIG. 17.

The first portion 1620 can include a tab 1640 at the first end 1614, and the fourth portion 1632 can include a slot 1644 inward from the second end 1616 and between the second end 1616 and the slot 1636. The slot 1636 can extend longitudinally along the fourth portion 1632, while the slot 1644 can extend in a direction transverse to the slot 1636. As depicted in FIG. 17, the tab 1640 can be received through the slot 1636 to engage the first portion 1620 with the fourth portion 1632.

Figure 18:
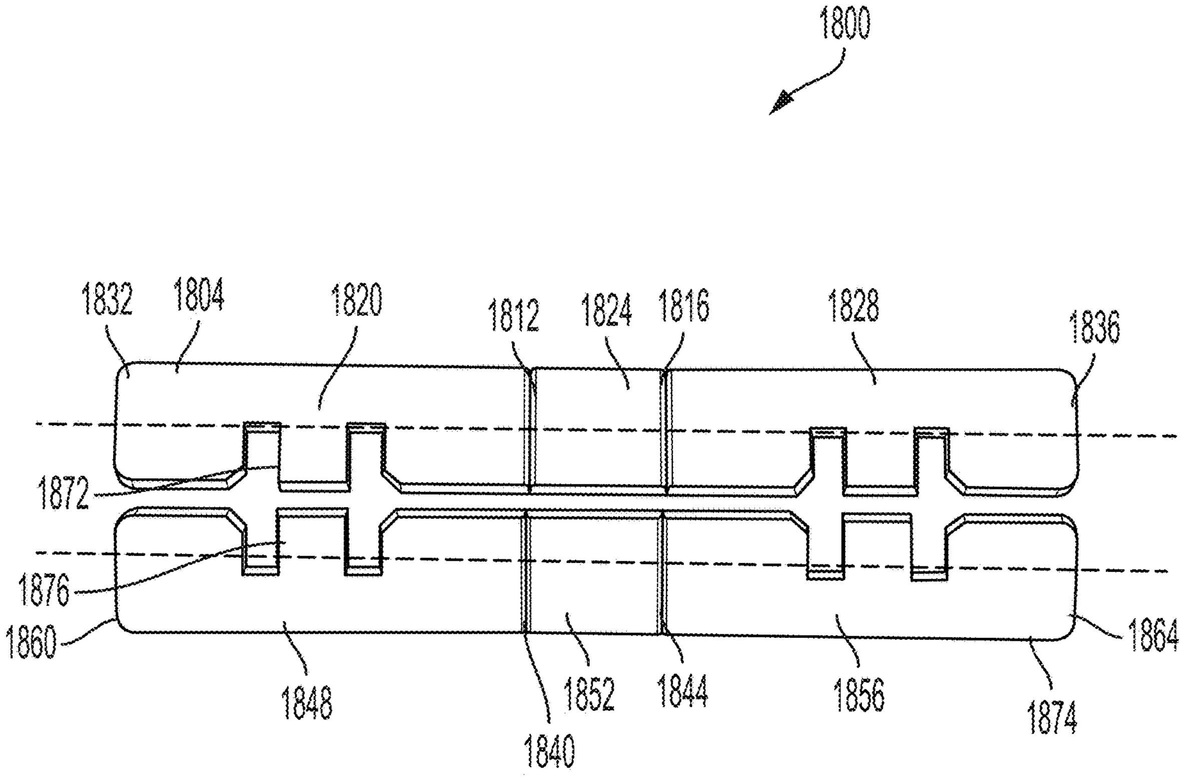
FIG. 18 is a perspective view of an example of a sprinkler protection device, in accordance with an implementation.
Figure 19:
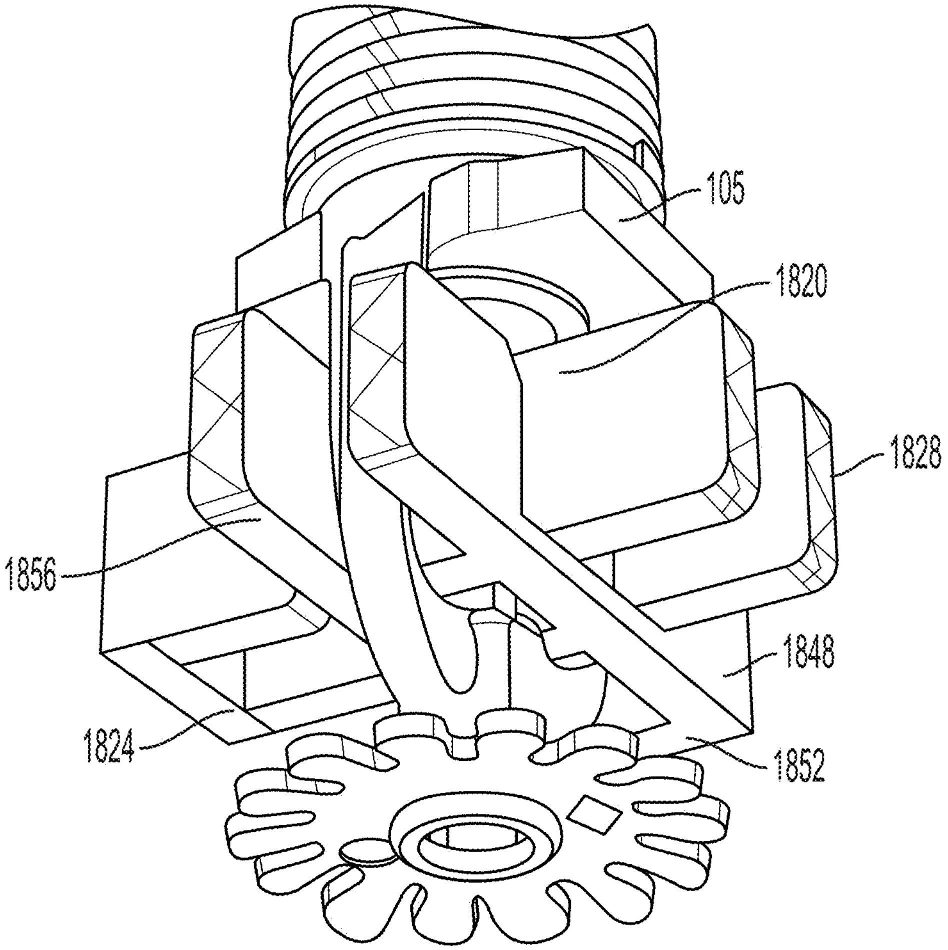
FIG. 19 is a perspective view of an example of a sprinkler coupled with a sprinkler protection device, in accordance with an implementation.

FIGS. 18 and 19 depict an example of a device 1800. The device 1800 can incorporate features of the device 1600 described with reference to FIGS. 16 and 17, and can implement a hash lock as compared with the interlock of the device 1600. The device 1800 can include a first member 1804 and a second member 1808, which can be similarly or identical to each other to be used interchangeably to facilitate usage.

The first member 1804 can include a first joint 1812 and a second joint 1816 to form a first portion 1820 between a first end 1832 and the first joint 1812, a second portion 1824 between the first joint 1812 and the second joint 1816, and a third portion 1828 between the second joint 1816 and a second end 1836 of the first member 1804. The first portion 1820 and the third portion 1828 can be longer than the second portion 1824. The first joint 1812 and second joint 1816 can allow the portions 1820, 1824, 1828 to be rotated around the respective joints 1812, 1816.

The second member 1808 can include a third joint 1840 and a second joint 1844 to form a fourth portion 1848 between a third end 1860 and the third joint 1840, a fifth portion 1852 between the third joint 1840 and the fourth joint 1844, and a sixth portion 1856 between the fourth joint 1844 and a fourth end 1864 of the second member 1808. The fourth portion 1848 and the sixth portion 1856 can be longer than the fifth portion 1852. The third joint 1840 and fourth joint 1844 can allow the portions 1848, 1852, 1856 to be rotated around the respective joints 1840, 1844.

The first portion 1820 and the third portion 1828 can each include a plurality of first slots 1872 that extend inward from an edge 1868 towards (e.g., proximate, up to, or past) a centrally defined longitudinal axis 1801 of the first member 1804. The fourth portion 1848 and the sixth portion 1856 can each include a plurality of second slots 1880 that extend inward from an edge 1874 towards a centrally defined longitudinal axis 1802 of the second member 1808. As depicted in FIG. 19, the first slots 1872 can engage the second slots 1880 to secure the device 1800 about the sprinkler 105.

Figure 20:
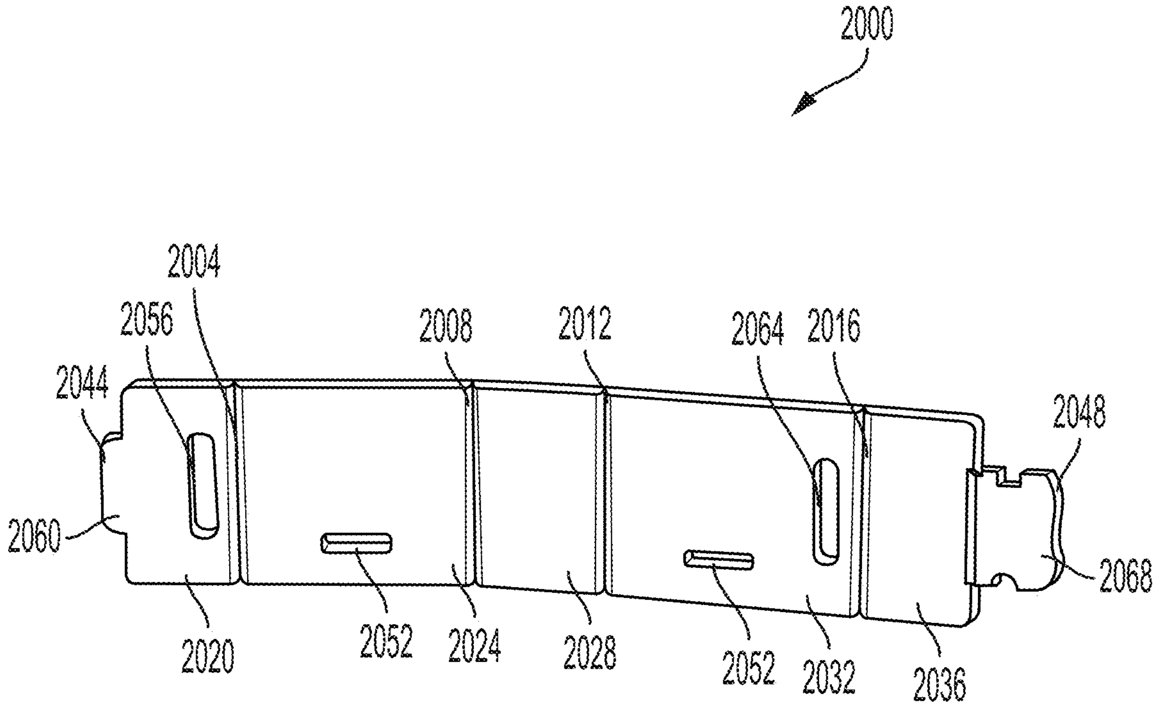
FIG. 20 is a perspective view of an example of a sprinkler protection device, in accordance with an implementation.
Figure 21:
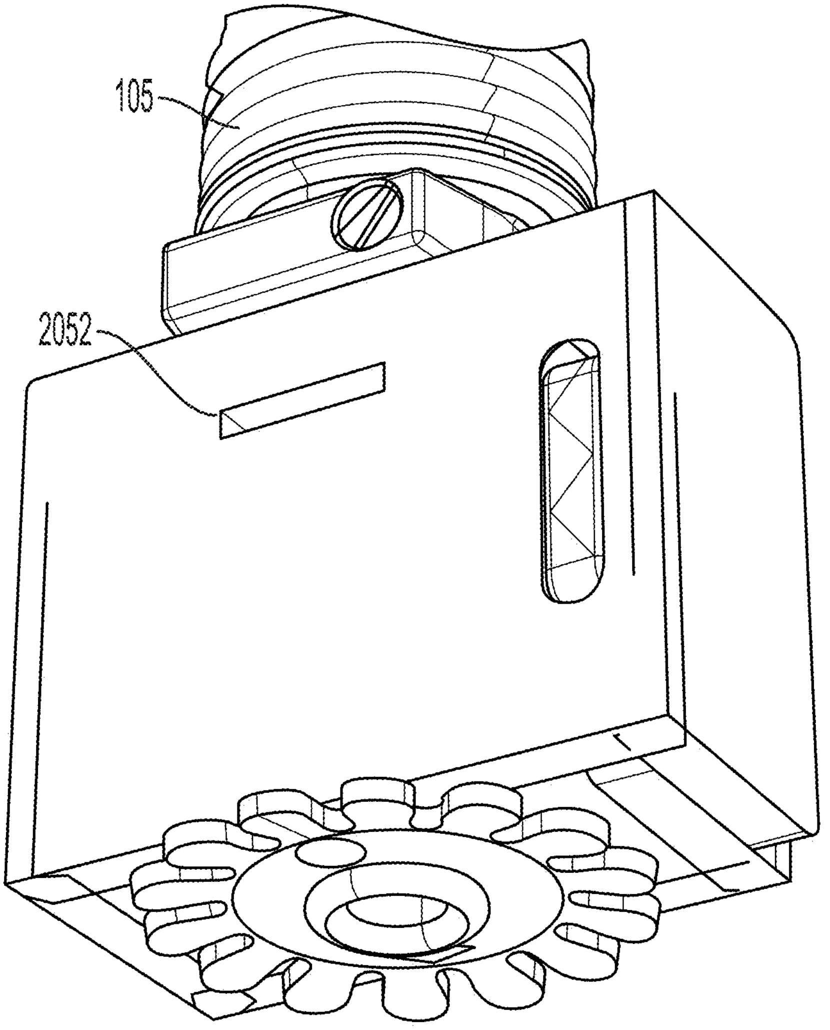
FIG. 21 is a perspective view of an example of a sprinkler coupled with a sprinkler protection device, in accordance with an implementation.

FIGS. 20 and 21 depict an example of a device 2000 (e.g., sprinkler protection device) to couple with the sprinkler 105. The device 2000 can incorporate features of the devices 1600, 1800. The device 2000 can form a sidelock.

As depicted in FIG. 20, the device 2000 can include a plurality of joints 2004, 2008, 2012, 2016 (e.g., first joint 2004, second joint 2008, third joint 2012, fourth joint 2016) forming a first portion 2020 between a first end 2044 and the first joint 2004, a second portion 2024 between the first joint 2004 and the second joint 2008, a third portion 2028 between the second joint 2008 and the third joint 2012, a fourth portion 2032 between the third joint 2012 and the fourth joint 2016, and a fifth portion 2036 between the fourth joint 2016 and a second end 2048.

The device 2000 can have slots 2052 defined by the second portion 2024 and the fourth portion 2032. The slots 2052 can be closer to an edge than a center of the respective portions 2024, 2032. The slots 2052 can receive portions of the sprinkler 105.

The first portion 2020 can have a slot 2056 proximate the first joint 2004 and a tab 2060 proximate the first end 2044, the fourth portion 2032 can have a slot 2064 proximate the fourth joint 2016 relative to the slot 2052, and the fifth portion 2036 can have a tab 2068 proximate the second end 2048. The tab 2060 can be received by the slot 2064, and the tab 2068 can be received by the slot 2052 to engage the portions of the device 2000 about the sprinkler 105. While FIGS. 20 and 21 depict the device 2000 as having five portions, two tabs (tabs 2060, 2068), and two slots (slots 2056, 2064), the device 2000 can have fewer portions, tabs, and slots, such as four portions, one slot, and one tab (e.g., the slot and tab can respectively be formed by end portions of the plurality of portions).

Figure 22:
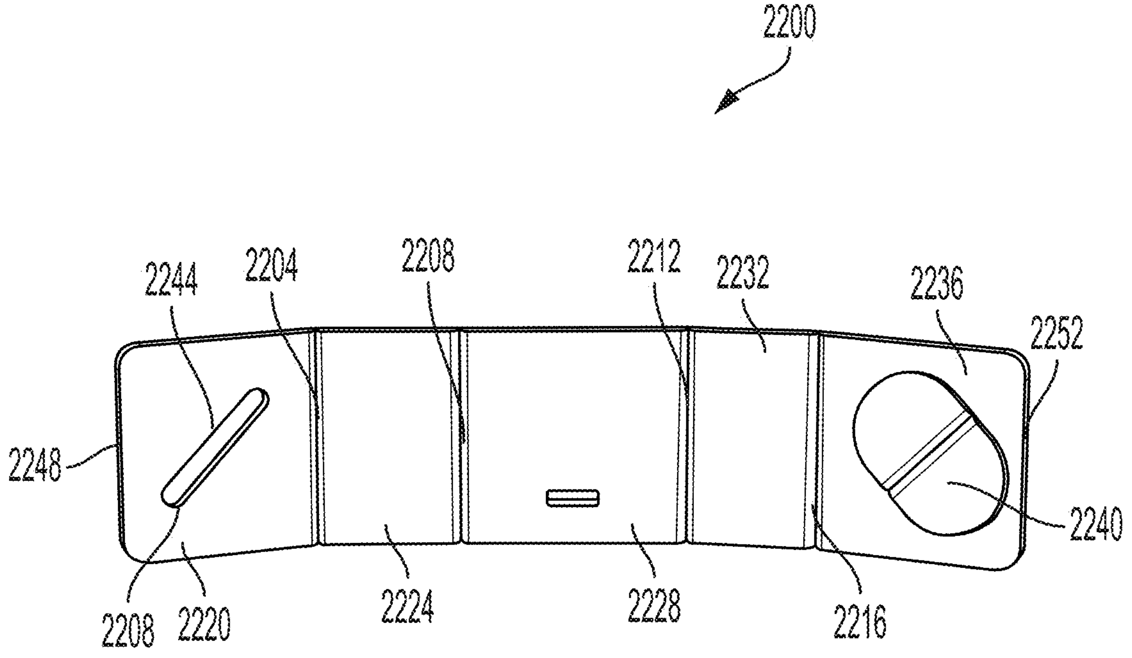
FIG. 22 is a perspective view of an example of a sprinkler protection device, in accordance with an implementation.
Figure 23:
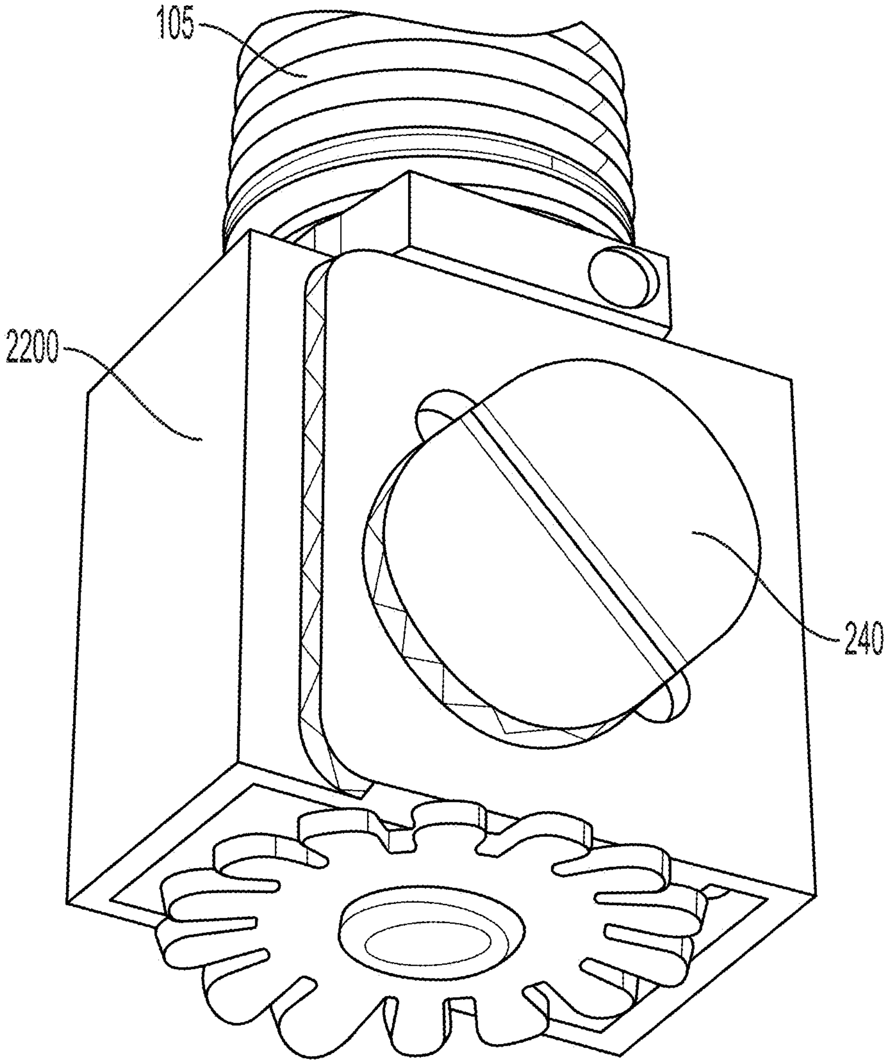
FIG. 23 is a perspective view of an example of a sprinkler coupled with a sprinkler protection device, in accordance with an implementation.

FIGS. 22 and 23 depict an example of a device 2200 (e.g., sprinkler protection device) to couple with the sprinkler 105. The device 2200 can incorporate features of various devices described herein, such as the devices 1600, 1800, 2000. The device 2200 can be used to implement a clasp lock.

As depicted in FIG. 22, the device 2200 can include a plurality of joints 2204, 2208, 2212, 2216 (e.g., first joint 2204, second joint 2208, third joint 2212, fourth joint 2216) that form a first portion 2220 between a first end 2248 and the first joint 2204, a second portion 2224 between the first joint 2204 and the second joint 2208, a third portion 2228 between the second joint 2208 and the third joint 2212, a fourth portion 2232 between the third joint 2212 and the fourth joint 2216, and a fifth portion 2236 between the fourth joint 2216 and a second end 2252.

The first portion 2208 can have a slot 2244, which can be oriented at an angle (e.g., acute angle) relative to a longitudinal axis of the device 2200. The fifth portion 2236 can have a fastener 2240 (e.g., clasp). As depicted in FIG. 23, the fastener 2240 can be coupled with the slot 2244 to form the device 2200 about the sprinkler 105.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure. References herein to the order of elements (e.g., "first," "second," "third," "fourth," "fifth," "sixth," "seventh") are merely used for ease of description relative to each element in the FIGURES.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. For example, the removable sprinkler protection device 100 may be used in various sprinkler applications. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A removable sprinkler protection device, comprising:
- a foldable unitary member, the foldable unitary member including:
  - a first portion having a first extension, a second extension, a third extension, and a fourth extension, the first extension forming a first opening, the second extension forming a second opening;
  - a second portion having a fifth extension, a sixth extension, and a seventh extension, the fifth extension forming a third opening, the sixth extension forming a fourth opening, the first opening and the third opening to align to form a fifth opening from overlap of the first extension with the fifth extension, the second opening and the fourth opening to align to form a sixth opening opposite the fifth opening from overlap of the second extension with the sixth extension;
  - the fourth extension disposed at least partially between the first portion and the second portion;
  - the seventh extension having a tab; and
- the foldable unitary member made at least partially of a biodegradable material.

2. The removable sprinkler protection device of claim 1, comprising:
- the biodegradable material is cardboard.

3. The removable sprinkler protection device of claim 1, comprising:
- the foldable unitary member having a plurality of perforations to facilitate folding the foldable unitary member with installation.

4. The removable sprinkler protection device of claim 1, comprising:
- the foldable unitary member having a plurality of projections.

5. The removable sprinkler protection device of claim 1, comprising:
- the first extension and the fifth extension to form the fifth opening to receive a first portion of a sprinkler with installation.

6. The removable sprinkler protection device of claim 1, comprising:
- the second extension and the sixth extension to form the sixth opening to receive a second portion of a sprinkler with installation.

7. The removable sprinkler protection device of claim 1, comprising:
- an image positioned on the foldable unitary member including an indication to recycle the foldable unitary member.

8. A sprinkler assembly, comprising:
- a sprinkler having a top end, a bottom end, and a sprinkler actuator that extends at least partially between the top end and the bottom end;
- a folded unitary member at least partially surrounding the sprinkler, the folded unitary member including:
  - a top side, a bottom side, a first sidewall, a second sidewall, a third sidewall, and a fourth sidewall;
  - a release tab portion;

top side having a first opening from overlap of two first extensions, the bottom side having a second opening from overlap of two second extensions, the first opening and the second opening to each receive a portion of the sprinkler; and the folded unitary member made at least partially of a biodegradable material.

9. The sprinkler assembly of claim 8, comprising:

the biodegradable material is cardboard.

10. The sprinkler assembly of claim 8, comprising:

the folded unitary member folded at a plurality of perforations.

11. The sprinkler assembly of claim 8, comprising:

the folded unitary member having a plurality of projections to extend towards a portion of the sprinkler.

12. The sprinkler assembly of claim 8, comprising:

the release tab portion to facilitate removing the folded unitary member from the sprinkler with a force in a direction away from the sprinkler.

13. The sprinkler assembly of claim 8, comprising:

an image positioned on the folded unitary member including an indication to recycle the folded unitary member with removal from the sprinkler.

14. The sprinkler assembly of claim 8, comprising:

the top side fully enclosing the top end of the sprinkler.

* * * * *